United States Patent
Xu et al.

(10) Patent No.: US 11,920,684 B1
(45) Date of Patent: Mar. 5, 2024

(54) MECHANICALLY OR HYBRID MOUNTED VALVE SEAT

(71) Applicant: Vulcan Industrial Holdings, LLC, Houston, TX (US)

(72) Inventors: Zhiyue Xu, Cypress, TX (US); Chance Ray Mullins, Spring, TX (US)

(73) Assignee: Vulcan Industrial Holdings, LLC, Houston, TX (US)

( * ) Notice: Subject to any disclaimer, the term of this patent is extended or adjusted under 35 U.S.C. 154(b) by 0 days.

(21) Appl. No.: 17/746,481

(22) Filed: May 17, 2022

(51) Int. Cl.
| | |
|---|---|
| *F16K 1/42* | (2006.01) |
| *B23P 15/00* | (2006.01) |
| *E21B 43/26* | (2006.01) |
| *F04B 19/04* | (2006.01) |
| *F04B 53/10* | (2006.01) |

(52) U.S. Cl.
CPC ............ *F16K 1/427* (2013.01); *B23P 15/001* (2013.01); *E21B 43/2607* (2020.05); *F04B 19/04* (2013.01); *F04B 53/10* (2013.01); *F04B 53/1022* (2013.01); *F04B 53/1087* (2013.01); *Y10T 137/7868* (2015.04)

(58) Field of Classification Search
CPC .. F04B 53/1087; F04B 53/1022; F16K 1/427; F16K 1/32–465; F16K 1/44–465
USPC .................... 251/359–365, 332; 137/516.29; 417/454, 451
See application file for complete search history.

(56) References Cited

U.S. PATENT DOCUMENTS

| | | | |
|---|---|---|---|
| 1,316,539 A * | 9/1919 | Ford | ......................... F16K 1/42 251/363 |
| 1,364,848 A * | 1/1921 | Walsh | ..................... F16K 1/427 251/363 |
| 1,576,269 A | 3/1926 | Durant | |
| 1,595,459 A | 8/1926 | Durant | |
| 1,671,139 A | 5/1928 | Wilson | |
| 1,873,318 A | 8/1932 | Eason | |
| 1,914,737 A | 6/1933 | Elms | |
| 1,948,628 A | 2/1934 | Penick | |
| 1,963,684 A | 6/1934 | Shimer | |
| 1,963,685 A | 6/1934 | Shimer | |

(Continued)

FOREIGN PATENT DOCUMENTS

| | | |
|---|---|---|
| CN | 201149099 | 11/2008 |
| CN | 102748483 | 10/2012 |

(Continued)

OTHER PUBLICATIONS

Declaration of Duncan Hall from Internet Archive/Wayback Machine, Feb. 3, 2021, Kerr Plunger Pump Manuals, 20 pages.

(Continued)

*Primary Examiner* — Craig J Price
(74) *Attorney, Agent, or Firm* — Womble Bond Dickinson (US) LLP

(57) ABSTRACT

A valve seat for use within a hydraulic fracturing pump includes a first portion including a strike face for interacting with a reciprocating component associated with the valve seat. The valve seat also includes a second portion having a recess to receive at least a portion of the first portion, the first portion being coupled to the second portion using a hybrid joining method that includes both a mechanical fastener to secure the first portion to the second portion and a joining process to secure the first portion to the second portion.

32 Claims, 16 Drawing Sheets

(56) References Cited

U.S. PATENT DOCUMENTS

| | | | |
|---|---|---|---|
| 2,011,547 A | 8/1935 | Campbell | |
| 2,069,443 A | 2/1937 | Hill | |
| 2,103,504 A | 12/1937 | White | |
| 2,143,399 A | 1/1939 | Abercrombie | |
| 2,151,442 A * | 3/1939 | Hardy | F04B 53/1087 |
| | | | 137/332 |
| 2,163,472 A * | 6/1939 | Shimer | F04B 53/1027 |
| | | | 137/902 |
| 2,252,488 A | 8/1941 | Bierend | |
| 2,304,991 A | 12/1942 | Foster | |
| 2,506,128 A | 5/1950 | Ashton | |
| 2,547,831 A | 4/1951 | Mueller | |
| 2,713,522 A | 7/1955 | Lorenz | |
| 2,719,737 A | 10/1955 | Fletcher | |
| 2,745,631 A | 5/1956 | Shellman | |
| 2,756,960 A | 7/1956 | Church | |
| 2,898,082 A | 8/1959 | Von Almen | |
| 2,969,951 A | 1/1961 | Walton | |
| 2,977,874 A * | 4/1961 | Ritzerfeld | B41L 39/00 |
| | | | 101/247 |
| 2,982,515 A | 5/1961 | Clinton | |
| 2,983,281 A | 5/1961 | Bynum | |
| 3,049,082 A | 8/1962 | Barry | |
| 3,053,500 A | 9/1962 | Atkinson | |
| 3,063,467 A | 11/1962 | Roberts, Jr. | |
| 3,224,817 A | 12/1965 | Carter | |
| 3,276,390 A | 10/1966 | Bloudoff | |
| 3,277,837 A | 10/1966 | Pangburn | |
| 3,288,475 A | 11/1966 | Benoit | |
| 3,459,363 A | 8/1969 | Miller | |
| 3,474,808 A | 10/1969 | Elliott | |
| 3,483,885 A | 12/1969 | Leathers | |
| 3,489,098 A | 1/1970 | Roth | |
| 3,489,170 A * | 1/1970 | Leman | F04B 53/1087 |
| | | | 251/363 |
| 3,512,787 A | 5/1970 | Kennedy | |
| 3,590,387 A * | 6/1971 | Landis | H01R 11/22 |
| | | | 439/860 |
| 3,640,501 A * | 2/1972 | Walton | F04B 53/1027 |
| | | | 137/902 |
| 3,809,508 A | 5/1974 | Uchiyama | |
| 3,907,307 A | 9/1975 | Maurer | |
| 3,931,755 A | 1/1976 | Hatridge | |
| 4,044,834 A | 8/1977 | Perkins | |
| 4,076,212 A | 2/1978 | Leman | |
| 4,184,814 A | 1/1980 | Parker | |
| 4,219,204 A | 8/1980 | Pippert | |
| 4,277,229 A | 7/1981 | Pacht | |
| 4,331,741 A | 5/1982 | Wilson | |
| 4,395,050 A | 7/1983 | Wirz | |
| 4,398,731 A | 8/1983 | Gorman | |
| 4,440,404 A | 4/1984 | Roach | |
| 4,508,133 A | 4/1985 | Hamid | |
| 4,518,359 A | 5/1985 | Yao-Psong | |
| 4,527,806 A | 7/1985 | Ungchusri | |
| 4,565,297 A | 1/1986 | Korner | |
| 4,662,392 A | 5/1987 | Vadasz | |
| 4,754,950 A | 7/1988 | Tada | |
| 4,763,876 A | 8/1988 | Oda | |
| 4,770,206 A | 9/1988 | Sjoberg | |
| 4,807,890 A | 2/1989 | Gorman | |
| 4,811,758 A | 3/1989 | Piper | |
| 4,861,241 A | 8/1989 | Gamboa | |
| 4,872,395 A | 10/1989 | Bennitt et al. | |
| 4,919,719 A | 4/1990 | Abe | |
| 4,951,707 A | 8/1990 | Johnson | |
| 5,020,490 A | 6/1991 | Seko | |
| 5,052,435 A | 10/1991 | Crudup | |
| 5,061,159 A | 10/1991 | Pryor | |
| 5,062,450 A | 11/1991 | Bailey | |
| 5,080,713 A | 1/1992 | Ishibashi | |
| 5,088,521 A | 2/1992 | Johnson | |
| 5,127,807 A | 7/1992 | Eslinger | |
| 5,131,666 A | 7/1992 | Hutchens | |
| 5,135,238 A | 8/1992 | Wells | |
| 5,149,107 A | 9/1992 | Maringer | |
| 5,201,491 A * | 4/1993 | Domangue | E21B 34/02 |
| | | | 251/363 |
| 5,209,495 A | 5/1993 | Palmour | |
| 5,249,600 A | 10/1993 | Blume | |
| 5,267,736 A | 12/1993 | Pietsch | |
| 5,273,570 A | 12/1993 | Sato | |
| 5,314,659 A | 5/1994 | Hidaka | |
| 5,478,048 A | 12/1995 | Salesky | |
| 5,533,245 A | 7/1996 | Stanton | |
| 5,540,570 A | 7/1996 | Schuller | |
| 5,572,920 A | 11/1996 | Kennedy | |
| 5,626,345 A | 5/1997 | Wallace | |
| 5,636,688 A | 6/1997 | Bassinger | |
| 5,674,449 A | 10/1997 | Liang | |
| 5,834,664 A | 11/1998 | Aonuma | |
| 5,859,376 A | 1/1999 | Ishibashi | |
| 5,895,517 A | 4/1999 | Kawamura | |
| 5,949,003 A | 9/1999 | Aoki | |
| 6,139,599 A | 10/2000 | Takahashi | |
| 6,200,688 B1 | 3/2001 | Liang | |
| 6,209,445 B1 | 4/2001 | Roberts, Jr. | |
| 6,328,312 B1 | 12/2001 | Schmitz | |
| 6,340,377 B1 | 1/2002 | Kawata | |
| 6,382,940 B1 | 5/2002 | Blume | |
| 6,436,338 B1 | 8/2002 | Qiao | |
| 6,446,939 B1 * | 9/2002 | Hoppe | F02M 17/40 |
| | | | 261/DIG. 8 |
| 6,460,620 B1 | 10/2002 | LaFleur | |
| 6,464,749 B1 | 10/2002 | Kawase | |
| 6,482,275 B1 | 11/2002 | Qiao | |
| 6,485,678 B1 | 11/2002 | Liang | |
| 6,544,012 B1 | 4/2003 | Blume | |
| 6,571,684 B1 | 6/2003 | Nov et al. | |
| 6,623,259 B1 | 9/2003 | Blume | |
| 6,634,236 B2 | 10/2003 | Mars | |
| 6,641,112 B2 | 11/2003 | Antoff | |
| 6,695,007 B2 | 2/2004 | Vicars | |
| 6,702,905 B1 | 3/2004 | Qiao | |
| 6,880,802 B2 | 4/2005 | Hara | |
| 6,910,871 B1 | 6/2005 | Blume | |
| 6,916,444 B1 | 7/2005 | Liang | |
| 6,951,165 B2 | 10/2005 | Kuhn | |
| 6,951,579 B2 | 10/2005 | Koyama | |
| 6,955,181 B1 | 10/2005 | Blume | |
| 6,959,916 B2 | 11/2005 | Chigasaki | |
| 7,000,632 B2 | 2/2006 | McIntire | |
| 7,036,824 B2 | 5/2006 | Kunz | |
| 7,144,440 B2 | 12/2006 | Ando | |
| 7,168,440 B1 | 1/2007 | Blume | |
| 7,186,097 B1 | 3/2007 | Blume | |
| 7,222,837 B1 | 5/2007 | Blume | |
| 7,290,560 B2 | 11/2007 | Orr | |
| 7,296,591 B2 | 11/2007 | Moe | |
| 7,335,002 B2 | 2/2008 | Vicars | |
| 7,341,435 B2 | 3/2008 | Vicars | |
| 7,398,955 B2 * | 7/2008 | Weingarten | F16K 1/427 |
| | | | 251/363 |
| 7,506,574 B2 | 3/2009 | Jensen | |
| 7,513,483 B1 | 4/2009 | Blume | |
| 7,513,759 B1 | 4/2009 | Blume | |
| 7,611,590 B2 | 11/2009 | Liang | |
| 7,681,589 B2 | 3/2010 | Schwegman | |
| 7,682,471 B2 | 3/2010 | Levin | |
| 7,726,026 B1 | 6/2010 | Blume | |
| 7,748,310 B2 | 7/2010 | Kennedy | |
| 7,754,142 B2 | 7/2010 | Liang | |
| 7,754,143 B2 | 7/2010 | Qiao | |
| 7,757,396 B2 | 7/2010 | Sawada | |
| 7,789,133 B2 | 9/2010 | McGuire | |
| 7,793,913 B2 | 9/2010 | Hara | |
| 7,828,053 B2 | 11/2010 | McGuire | |
| 7,845,413 B2 | 12/2010 | Shampine | |
| 7,861,738 B2 | 1/2011 | Erbes | |
| 7,866,346 B1 | 1/2011 | Walters | |
| 7,891,374 B2 | 2/2011 | Vicars | |
| 7,954,510 B2 | 6/2011 | Schwegman | |
| 7,992,635 B2 | 8/2011 | Cherewyk | |

(56) References Cited

U.S. PATENT DOCUMENTS

| | | |
|---|---|---|
| 8,069,923 B2 | 12/2011 | Blanco |
| 8,075,661 B2 | 12/2011 | Chen |
| 8,083,506 B2 | 12/2011 | Maki |
| 8,100,407 B2 | 1/2012 | Stanton |
| 8,141,849 B1 | 3/2012 | Blume |
| 8,147,227 B1 | 4/2012 | Blume |
| 8,181,970 B2 | 5/2012 | Smith |
| 8,261,771 B2 | 9/2012 | Witkowski |
| 8,287,256 B2 | 10/2012 | Shafer |
| 8,291,927 B2 | 10/2012 | Johnson |
| 8,317,498 B2 | 11/2012 | Gambier |
| 8,375,980 B2 | 2/2013 | Higashiyama |
| 8,376,723 B2 | 2/2013 | Kugelev |
| 8,402,880 B2 | 3/2013 | Patel |
| 8,430,075 B2 | 4/2013 | Qiao |
| D687,125 S | 7/2013 | Hawes |
| 8,479,700 B2 | 7/2013 | Qiao |
| 8,511,218 B2 | 8/2013 | Cordes |
| 8,522,667 B2 | 9/2013 | Clemens |
| 8,528,585 B2 | 9/2013 | McGuire |
| 8,534,691 B2 | 9/2013 | Schaffer |
| 8,613,886 B2 | 12/2013 | Qiao |
| 8,662,864 B2 | 3/2014 | Bayyouk |
| 8,662,865 B2 | 3/2014 | Bayyouk |
| 8,668,470 B2 | 3/2014 | Bayyouk |
| 8,707,853 B1 | 4/2014 | Dille |
| 8,733,313 B2 | 5/2014 | Sato |
| 8,784,081 B1 | 7/2014 | Blume |
| 8,828,312 B2 | 9/2014 | Yao |
| 8,870,554 B2 | 10/2014 | Kent |
| 8,893,806 B2 | 11/2014 | Williamson |
| 8,894,392 B1 | 11/2014 | Blume |
| 8,915,722 B1 | 12/2014 | Blume |
| 8,940,110 B2 | 1/2015 | Qiao |
| 8,978,695 B2 | 3/2015 | Witkowkski |
| 8,998,593 B2 | 4/2015 | Vicars |
| 9,010,412 B2 | 4/2015 | Mcguire |
| 9,103,448 B2 | 8/2015 | Nitkowski |
| 9,150,945 B2 | 10/2015 | Bei |
| 9,157,136 B2 | 10/2015 | Chou |
| 9,157,468 B2 | 10/2015 | Dille |
| 9,206,910 B2 | 12/2015 | Kahn |
| D748,228 S | 1/2016 | Bayyouk |
| 9,260,933 B2 | 2/2016 | Artherholt |
| 9,261,195 B2 | 2/2016 | Toynbee |
| 9,273,543 B2 | 3/2016 | Baca |
| 9,284,631 B2 | 3/2016 | Radon |
| 9,284,953 B2 | 3/2016 | Blume |
| 9,285,040 B2 | 3/2016 | Forrest |
| 9,291,274 B1 | 3/2016 | Blume |
| 9,322,243 B2 | 4/2016 | Baca |
| 9,334,547 B2 | 5/2016 | Qiao |
| 9,340,856 B2 | 5/2016 | Otobe |
| 9,359,921 B2 | 6/2016 | Hashimoto |
| 9,365,913 B2 | 6/2016 | Imaizumi |
| 9,371,919 B2 | 6/2016 | Forrest |
| 9,376,930 B2 | 6/2016 | Kim |
| 9,377,019 B1 | 6/2016 | Blume |
| 9,382,940 B2 | 7/2016 | Lee |
| 9,416,887 B2 | 8/2016 | Blume |
| 9,435,454 B2 | 9/2016 | Blume |
| 9,441,776 B2 | 9/2016 | Bryne |
| 9,458,743 B2 | 10/2016 | Qiao |
| 9,464,730 B2 | 10/2016 | Bihlet |
| 9,500,195 B2 | 11/2016 | Blume |
| 9,506,382 B2 | 11/2016 | Yeager |
| 9,528,508 B2 | 12/2016 | Thomeer |
| 9,528,631 B2 | 12/2016 | McCarty |
| 9,534,473 B2 | 1/2017 | Morris |
| 9,534,691 B2 | 1/2017 | Miller |
| 9,556,761 B2 | 1/2017 | Koyama |
| 9,568,138 B2 | 2/2017 | Arizpe |
| 9,605,767 B2 | 3/2017 | Chhabra |
| 9,631,739 B2 | 4/2017 | Belshan |
| D787,029 S | 5/2017 | Bayyouk |
| 9,638,075 B2 | 5/2017 | Qiao |
| 9,638,337 B2 | 5/2017 | Witkowski |
| 9,650,882 B2 | 5/2017 | Zhang |
| 9,651,067 B2 | 5/2017 | Beschorner |
| 9,689,364 B2 | 6/2017 | Mack |
| 9,695,812 B2 | 7/2017 | Dille |
| 9,732,746 B2 | 8/2017 | Chandrasekaran |
| 9,732,880 B2 | 8/2017 | Haines |
| 9,745,968 B2 | 8/2017 | Kotapish |
| 9,784,262 B2 | 10/2017 | Bayyouk |
| 9,822,894 B2 | 11/2017 | Bayyouk et al. |
| 9,845,801 B1 | 12/2017 | Shek |
| 9,857,807 B2 | 1/2018 | Baca |
| 9,915,250 B2 | 3/2018 | Brasche |
| 9,920,615 B2 | 3/2018 | Zhang |
| 9,927,036 B2 | 3/2018 | Dille |
| 9,945,362 B2 | 4/2018 | Skurdalsvold |
| 9,945,375 B2 | 4/2018 | Zhang |
| 9,989,044 B2 | 6/2018 | Bayyouk |
| 10,029,540 B2 | 7/2018 | Seeger |
| 10,041,490 B1 | 8/2018 | Jahnke |
| 10,082,137 B2 | 9/2018 | Graham |
| 10,094,478 B2 | 10/2018 | Tijima |
| 10,113,679 B2 | 10/2018 | Shuck |
| 10,184,470 B2 | 1/2019 | Barnett, Jr. |
| 10,190,197 B2 | 1/2019 | Baker |
| 10,197,172 B2 | 2/2019 | Fuller |
| 10,215,172 B2 | 2/2019 | Wood |
| 10,221,848 B2 | 3/2019 | Bayyouk |
| 10,240,594 B2 | 3/2019 | Barnhouse, Jr. |
| 10,240,597 B2 | 3/2019 | Bayyouk |
| 10,247,182 B2 | 4/2019 | Zhang |
| 10,247,184 B2 | 4/2019 | Chunn |
| 10,273,954 B2 | 4/2019 | Brown |
| 10,288,178 B2 | 5/2019 | Nowell |
| 10,316,832 B2 | 6/2019 | Byrne |
| 10,330,097 B2 | 6/2019 | Skurdalsvold |
| 10,344,757 B1 * | 7/2019 | Stark .............. F04B 39/10 |
| 10,364,487 B2 | 7/2019 | Park |
| D856,498 S | 8/2019 | Bayyouk |
| 10,378,535 B2 | 8/2019 | Mahmood |
| 10,378,538 B2 | 8/2019 | Blume |
| 10,393,113 B2 | 8/2019 | Wagner |
| 10,400,764 B2 | 9/2019 | Wagner |
| 10,415,348 B2 | 9/2019 | Zhang |
| 10,428,406 B2 | 10/2019 | Yao |
| 10,428,949 B2 | 10/2019 | Miller |
| 10,436,193 B1 | 10/2019 | Jahnke |
| 10,443,456 B2 | 10/2019 | Hoeg |
| 10,465,680 B1 | 11/2019 | Guerra |
| 10,472,702 B2 | 11/2019 | Yeh |
| 10,487,528 B2 | 11/2019 | Pozybill |
| 10,519,070 B2 | 12/2019 | Sanders |
| 10,519,950 B2 | 12/2019 | Foster |
| 10,526,862 B2 | 1/2020 | Witkowski |
| 10,527,036 B2 | 1/2020 | Blume |
| 10,557,446 B2 | 2/2020 | Stecklein |
| 10,557,576 B2 | 2/2020 | Witkowski |
| 10,557,580 B2 | 2/2020 | Mendyk |
| 10,563,494 B2 | 2/2020 | Graham |
| 10,563,649 B2 | 2/2020 | Zhang |
| 10,570,491 B2 | 2/2020 | Hong |
| 10,576,538 B2 | 3/2020 | Kato |
| 10,577,580 B2 | 3/2020 | Abbas |
| 10,577,850 B2 | 3/2020 | Ozkan |
| 10,591,070 B2 | 3/2020 | Nowell |
| 10,605,374 B2 | 3/2020 | Takaki |
| 10,626,856 B2 | 4/2020 | Coldren |
| 10,633,925 B2 | 4/2020 | Panda |
| 10,634,260 B2 | 4/2020 | Said |
| 10,640,854 B2 | 5/2020 | Hu |
| 10,655,623 B2 | 5/2020 | Blume |
| 10,663,071 B2 | 5/2020 | Bayyouk |
| 10,670,013 B2 | 6/2020 | Foster |
| 10,670,153 B2 | 6/2020 | Filipow |
| 10,670,176 B2 | 6/2020 | Byrne |
| 10,677,109 B2 | 6/2020 | Qiao |
| 10,677,240 B2 | 6/2020 | Graham |
| 10,677,365 B2 | 6/2020 | Said |

(56) References Cited

U.S. PATENT DOCUMENTS

| | | | |
|---|---|---|---|
| 10,711,754 B2 | 7/2020 | Nelson | |
| 10,711,778 B2 | 7/2020 | Buckley | |
| 10,718,441 B2 | 7/2020 | Myers | |
| 10,731,523 B2 | 8/2020 | Qu | |
| 10,731,643 B2 | 8/2020 | DeLeon | |
| 10,738,928 B2 | 8/2020 | Arizpe | |
| 10,753,490 B2 | 8/2020 | Fuller | |
| 10,753,495 B2 | 8/2020 | Bayyouk | |
| 10,767,520 B1 | 9/2020 | Hattiangadi | |
| 10,771,567 B2* | 9/2020 | Sundaresan | H04W 4/60 |
| 10,774,828 B1* | 9/2020 | Smith | F04B 53/1022 |
| 10,781,803 B2 | 9/2020 | Kumar | |
| 10,787,725 B2 | 9/2020 | Fujieda | |
| 10,801,627 B2 | 10/2020 | Warbey | |
| 10,808,488 B2 | 10/2020 | Witkowski | |
| 10,815,988 B2 | 10/2020 | Buckley | |
| 10,830,360 B2 | 11/2020 | Frank | |
| 10,851,775 B2 | 12/2020 | Stark | |
| 10,865,325 B2 | 12/2020 | Nakao | |
| 10,907,738 B2 | 2/2021 | Nowell | |
| 10,914,171 B2 | 2/2021 | Foster | |
| 10,934,899 B2 | 3/2021 | Hattiangadi | |
| 10,941,765 B2* | 3/2021 | Nowell | F04B 1/0404 |
| 10,941,866 B2 | 3/2021 | Nowell | |
| 10,954,938 B2 | 3/2021 | Stark | |
| 10,961,607 B2 | 3/2021 | Oshima | |
| 10,962,001 B2 | 3/2021 | Nowell | |
| D916,240 S | 4/2021 | Nowell | |
| 10,968,717 B2 | 4/2021 | Tran | |
| 10,988,834 B2 | 4/2021 | Lee | |
| 10,989,321 B2 | 4/2021 | Hattiangadi | |
| 10,995,738 B2 | 5/2021 | Blume | |
| 11,028,662 B2 | 6/2021 | Rhodes | |
| 11,041,570 B1 | 6/2021 | Buckley | |
| 11,078,903 B2 | 8/2021 | Nowell | |
| 11,104,981 B2 | 8/2021 | Chen | |
| 11,105,185 B2 | 8/2021 | Spencer | |
| 11,105,327 B2 | 8/2021 | Hurst | |
| 11,105,328 B2 | 8/2021 | Bryne | |
| 11,105,428 B2 | 8/2021 | Warbey | |
| 11,111,915 B2 | 9/2021 | Bayyouk | |
| 11,131,397 B2 | 9/2021 | Yar | |
| D933,104 S | 10/2021 | Ellisor | |
| D933,105 S | 10/2021 | Ellisor | |
| D933,106 S | 10/2021 | Mullins | |
| D933,107 S | 10/2021 | Mullins | |
| 11,149,514 B2 | 10/2021 | Witkowski | |
| 11,162,859 B2 | 11/2021 | Lei | |
| 11,181,101 B2 | 11/2021 | Byrne | |
| 11,181,108 B2 | 11/2021 | Brooks | |
| 11,231,111 B2* | 1/2022 | Hurst | F04B 15/02 |
| 11,242,849 B1 | 2/2022 | Smith | |
| 11,353,117 B1* | 6/2022 | Smith | F16K 15/06 |
| 11,384,756 B1* | 7/2022 | Smith | F16K 25/005 |
| 11,391,374 B1 | 7/2022 | Ellisor | |
| 11,421,679 B1 | 8/2022 | Mullins | |
| 11,421,680 B1 | 8/2022 | Smith | |
| 11,434,900 B1 | 9/2022 | Alex | |
| 11,473,686 B2* | 10/2022 | Bayyouk | C23C 24/103 |
| 11,566,713 B2* | 1/2023 | Poremski | F16K 3/30 |
| D980,876 S | 3/2023 | Smith | |
| D986,928 S | 5/2023 | Smith et al. | |
| D997,992 S | 9/2023 | Smith et al. | |
| 11,761,441 B1 | 9/2023 | Alex et al. | |
| 11,846,356 B1 | 12/2023 | Ellisor | |
| 2002/0084004 A1 | 7/2002 | Takahashi | |
| 2002/0124961 A1 | 9/2002 | Porter | |
| 2002/0159914 A1 | 10/2002 | Yeh | |
| 2003/0205864 A1 | 11/2003 | Dietle | |
| 2003/0233910 A1 | 12/2003 | Jeong | |
| 2004/0170507 A1 | 9/2004 | Vicars | |
| 2004/0194576 A1 | 10/2004 | Ando | |
| 2004/0234404 A1 | 11/2004 | Vicars | |
| 2004/0255410 A1 | 12/2004 | Schonewille | |
| 2004/0258557 A1 | 12/2004 | Shun | |
| 2005/0095156 A1 | 5/2005 | Wolters | |
| 2005/0200081 A1 | 9/2005 | Stanton | |
| 2005/0226754 A1 | 10/2005 | Orr | |
| 2006/0002806 A1 | 1/2006 | Baxter | |
| 2006/0027779 A1 | 2/2006 | McGuire | |
| 2006/0045782 A1 | 3/2006 | Kretzinger | |
| 2007/0086910 A1 | 4/2007 | Liang | |
| 2007/0154342 A1 | 7/2007 | Tu | |
| 2007/0273105 A1 | 11/2007 | Stanton | |
| 2007/0295411 A1 | 12/2007 | Schwegman | |
| 2008/0031769 A1 | 2/2008 | Yeh | |
| 2008/0092384 A1 | 4/2008 | Schaake | |
| 2008/0240949 A1 | 10/2008 | Tackett et al. | |
| 2008/0279706 A1 | 11/2008 | Gambier | |
| 2009/0041611 A1 | 2/2009 | Sathian | |
| 2009/0278069 A1 | 11/2009 | Blanco | |
| 2009/0261575 A1 | 12/2009 | Bull | |
| 2010/0230628 A1 | 9/2010 | Stefina | |
| 2010/0272597 A1 | 12/2010 | Qiao | |
| 2011/0079302 A1 | 4/2011 | Hawes | |
| 2011/0142701 A1 | 6/2011 | Small | |
| 2011/0189040 A1 | 8/2011 | Vicars | |
| 2011/0255993 A1 | 10/2011 | Ochoa | |
| 2012/0141308 A1 | 6/2012 | Saini | |
| 2012/0163969 A1 | 6/2012 | Ongole | |
| 2012/0259593 A1 | 10/2012 | El-Zein | |
| 2012/0304821 A1 | 12/2012 | Ando | |
| 2013/0020521 A1 | 1/2013 | Byrne | |
| 2013/0037739 A1 | 2/2013 | Millard | |
| 2013/0202457 A1 | 8/2013 | Bayyouk | |
| 2013/0202458 A1 | 8/2013 | Byrne | |
| 2013/0319220 A1 | 12/2013 | Luharuka | |
| 2014/0083541 A1 | 3/2014 | Chandrasekaran | |
| 2014/0083547 A1 | 3/2014 | Hwang | |
| 2014/0196883 A1 | 7/2014 | Artherholt | |
| 2014/0260954 A1 | 9/2014 | Young | |
| 2014/0286805 A1 | 9/2014 | Dyer | |
| 2014/0322034 A1 | 10/2014 | Bayyouk | |
| 2014/0322050 A1 | 10/2014 | Marette et al. | |
| 2014/0348677 A1 | 11/2014 | Moeller | |
| 2015/0132157 A1 | 5/2015 | Whaley | |
| 2015/0144826 A1 | 5/2015 | Bayyouk | |
| 2015/0147194 A1 | 5/2015 | Foote | |
| 2015/0219096 A1 | 8/2015 | Jain | |
| 2015/0300332 A1 | 10/2015 | Kotapish | |
| 2015/0368775 A1 | 12/2015 | Baker | |
| 2016/0201169 A1 | 7/2016 | Vecchio | |
| 2016/0215588 A1 | 7/2016 | Belshan | |
| 2016/0238156 A1 | 8/2016 | Hubenschmidt | |
| 2016/0245280 A1 | 8/2016 | Todorov | |
| 2016/0319626 A1 | 11/2016 | Dille | |
| 2016/0319805 A1 | 11/2016 | Dille | |
| 2017/0067425 A1 | 3/2017 | Bayyouk | |
| 2017/0089334 A1 | 3/2017 | Jahnke | |
| 2017/0089470 A1 | 3/2017 | Filipow et al. | |
| 2017/0089473 A1 | 3/2017 | Nowell | |
| 2017/0097107 A1 | 4/2017 | Hotz | |
| 2017/0159655 A1 | 6/2017 | Morreale | |
| 2017/0218951 A1 | 8/2017 | Graham | |
| 2017/0218993 A1 | 8/2017 | Freed | |
| 2017/0297149 A1 | 10/2017 | Shinohara | |
| 2017/0298932 A1 | 10/2017 | Wagner | |
| 2017/0314097 A1 | 11/2017 | Hong | |
| 2017/0342776 A1 | 11/2017 | Bullock | |
| 2017/0342976 A1 | 11/2017 | Reddy | |
| 2018/0017173 A1 | 1/2018 | Nowell | |
| 2018/0058431 A1 | 3/2018 | Blume | |
| 2018/0073653 A1* | 3/2018 | Bayyouk | F04B 53/10 |
| 2018/0202434 A1 | 7/2018 | Barnhouse, Jr. | |
| 2018/0298894 A1 | 10/2018 | Wagner | |
| 2018/0312946 A1 | 11/2018 | Gigliotti, Jr. | |
| 2018/0320258 A1 | 11/2018 | Stewart | |
| 2018/0340245 A1 | 11/2018 | Kernion | |
| 2018/0354081 A1 | 12/2018 | Kalyani | |
| 2019/0011051 A1 | 1/2019 | Yeung | |
| 2019/0017503 A1 | 1/2019 | Foster | |
| 2019/0024198 A1 | 1/2019 | Hong | |
| 2019/0024225 A1 | 1/2019 | Tang | |
| 2019/0032685 A1 | 1/2019 | Foster | |

(56) References Cited

U.S. PATENT DOCUMENTS

| | | |
|---|---|---|
| 2019/0032720 A1 | 1/2019 | Bayyouk |
| 2019/0047049 A1 | 2/2019 | Fujieda |
| 2019/0049052 A1 | 2/2019 | Shuck |
| 2019/0063427 A1 | 2/2019 | Nowell |
| 2019/0071755 A1 | 3/2019 | Lee |
| 2019/0072088 A1 | 3/2019 | DeLeon |
| 2019/0072089 A1 | 3/2019 | Buckley |
| 2019/0085806 A1 | 3/2019 | Meibgeier |
| 2019/0085978 A1 | 3/2019 | Chase |
| 2019/0101109 A1 | 4/2019 | Cortes |
| 2019/0107226 A1 | 4/2019 | Bayyouk |
| 2019/0120389 A1 | 4/2019 | Foster |
| 2019/0136842 A1 | 5/2019 | Nowell |
| 2019/0145400 A1 | 5/2019 | Graham |
| 2019/0145568 A1 | 5/2019 | Nick |
| 2019/0154033 A1 | 5/2019 | Brooks |
| 2019/0170137 A1 | 6/2019 | Chase |
| 2019/0170138 A1 | 6/2019 | Bayyouk |
| 2019/0194786 A1 | 6/2019 | Chuang |
| 2019/0226058 A1 | 7/2019 | Fujieda |
| 2019/0063430 A1 | 8/2019 | Byrne |
| 2019/0242373 A1 | 8/2019 | Wernig |
| 2019/0247957 A1 | 8/2019 | Stribling |
| 2019/0264683 A1 | 8/2019 | Smith |
| 2019/0292633 A1 | 9/2019 | Porret |
| 2019/0301314 A1 | 10/2019 | Kamo |
| 2019/0301447 A1 | 10/2019 | Skurdalsvold |
| 2019/0316685 A1 | 10/2019 | Wang |
| 2019/0360483 A1 | 11/2019 | Nowell |
| 2019/0376508 A1 | 12/2019 | Wagner |
| 2020/0056272 A1 | 2/2020 | Hong |
| 2020/0063899 A1 | 2/2020 | Witkowkski |
| 2020/0080660 A1 | 3/2020 | Dyer |
| 2020/0080661 A1 | 3/2020 | Mullins |
| 2020/0157663 A1 | 5/2020 | Yang |
| 2020/0158123 A1 | 5/2020 | Chen |
| 2020/0173317 A1 | 6/2020 | Keating |
| 2020/0023245 A1 | 7/2020 | Blume |
| 2020/0208776 A1 | 7/2020 | Bayyouk |
| 2020/0217424 A1 | 7/2020 | Rasmussen |
| 2020/0240531 A1 | 7/2020 | Nowell |
| 2020/0256149 A1 | 8/2020 | Witkowski |
| 2020/0284253 A1 | 9/2020 | Foster |
| 2020/0284365 A1 | 9/2020 | Bayyouk |
| 2020/0290118 A1 | 9/2020 | Chen |
| 2020/0291731 A1 | 9/2020 | Haiderer |
| 2020/0300240 A1 | 9/2020 | Nowell |
| 2020/0308683 A1 | 10/2020 | Kue |
| 2020/0347843 A1 | 11/2020 | Mullins |
| 2020/0355182 A1 | 11/2020 | DeLeon |
| 2020/0362970 A1* | 11/2020 | Hurst ............... F04B 53/102 |
| 2020/0392613 A1 | 12/2020 | Won |
| 2020/0393054 A1 | 12/2020 | Fuller |
| 2020/0399979 A1 | 12/2020 | Webster |
| 2020/0400003 A1 | 12/2020 | Webster |
| 2020/0400130 A1 | 12/2020 | Poehls |
| 2020/0400132 A1 | 12/2020 | Kumar |
| 2020/0400140 A1 | 12/2020 | Bayyouk |
| 2020/0400234 A1 | 12/2020 | Mullins et al. |
| 2020/0400242 A1 | 12/2020 | Spencer |
| 2021/0010113 A1 | 1/2021 | Qiao |
| 2021/0010470 A1 | 1/2021 | Blume |
| 2021/0017830 A1 | 1/2021 | Witkowski |
| 2021/0017982 A1* | 1/2021 | Bayyouk ............ F16K 25/04 |
| 2021/0017983 A1 | 1/2021 | Myers |
| 2021/0040836 A1 | 2/2021 | Baskin |
| 2021/0054486 A1 | 2/2021 | Kim |
| 2021/0102630 A1 | 4/2021 | Nowell |
| 2021/0108734 A1 | 4/2021 | Nowell |
| 2021/0130936 A1 | 5/2021 | Wu |
| 2021/0148471 A1 | 5/2021 | Murugesan |
| 2021/0180156 A1 | 6/2021 | Kim |
| 2021/0190053 A1 | 6/2021 | Wagner |
| 2021/0190223 A1 | 6/2021 | Bayyouk |
| 2021/0197524 A1 | 7/2021 | Maroli |
| 2021/0215071 A1 | 7/2021 | Oikawa |
| 2021/0215154 A1 | 7/2021 | Nowell |
| 2021/0230987 A1 | 7/2021 | Tanner |
| 2021/0239111 A1 | 8/2021 | Zitting |
| 2021/0246537 A1 | 8/2021 | Maroli |
| 2021/0260704 A1 | 8/2021 | Hu |
| 2021/0270261 A1 | 9/2021 | Zhang |
| 2021/0285551 A1 | 9/2021 | Renollett |
| 2021/0310484 A1 | 10/2021 | Myers |
| 2021/0381504 A1 | 12/2021 | Wagner |
| 2021/0381615 A1 | 12/2021 | Riedel |
| 2021/0388832 A1 | 12/2021 | Byrne |
| 2022/0026326 A1 | 1/2022 | Wang |
| 2022/0034402 A1 | 2/2022 | Kiani |
| 2022/0349472 A1 | 11/2022 | Ellisor |
| 2022/0390055 A1 | 12/2022 | Ellisor |
| 2022/0403839 A1 | 12/2022 | Mullins |
| 2023/0407864 A1 | 12/2023 | Alex et al. |

FOREIGN PATENT DOCUMENTS

| | | |
|---|---|---|
| CN | 102410194 | 4/2021 |
| EP | 0 414 955 | 3/1991 |

OTHER PUBLICATIONS

Michael Agnes, Editor, Webster's New World College Dictionary, Fourth Edition, 1999, 5 pages.

Weir SPM Oil & Gas, Grooveless Fluid End, 2008, 1 page.

Weir SPM Oil & Gas, Weir SPM General Catalog, 2009, 40 pages.

Weir SPM Oil & Gas, Well Service Pump Reference Guide, 2008, 55 pages.

*Intellectual Ventures I LLC v VMWare, Inc.*, Case No. 1:19-CV-01075-ADA, Document 91 (W.D. Tex Jun. 3, 2020), Defendant VMWare, Inc.'s Stipulation of Invalidity Contentions for U.S. Pat. No. 7,949,752, Jun. 3, 2020, 5 pages.

*Vulcan Industrial Holding, LLC et al. v. Kerr Machine Co.* Case No. 4:21-cv-433, Document 1, Complaint for Declaratory Judgment of Patent Non-Infringement, Feb. 9, 2021, 17 pages.

*Trilogy Enterprises, Inc., v. Trilogy Education Services, LLC*, Case. No. 6:19-cv-199-ADA-JCM, Document 35, Fifth Amended Scheduling Order, Sep. 8, 2020, 4 pages.

*Dr. Corneliu Bolbocean v Baylor University*, Case No. 6:19-CV-00465-ADA-JCM, Document 34, Scheduling Order, Apr. 6, 2020, 4 pages.

*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044-ADA, Document 4, Plaintiff's Amended Complaint for Patent Infringement and Jury Demand, Jan. 19, 2021, 30 pages.

*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044, Document 1, Plaintiff's Original Complaint for Patent Infringement and Jury Demand, Jan. 19, 2021, 47 pages.

*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044-ADA, Document 10, Plaintiff's Second Amended Complaint for Patent Infringement and Jury Demand, Feb. 1, 2021, 88 pages.

*Kerr Machine Co., v Vulcan Industrial Holdings, LLC, Vulcan Energy Services, LLC, Cizion, LLC*, Case No. W-20- CV-00200-ADA-24, Order Setting Trial Date, Jun. 14, 2020, 1 page.

*Kerr Machine Co., v Vulcan Industrial Holdings, LLC, Vulcan Energy Services, LLC, Cizion, LLC*, Case No. W-20-CV-00200-ADA-29, Order Setting Trial Date, Aug. 2, 2020, 1 page.

*Kerr Machine Co., v. Vulcan Industrial Holdings, LLC*, Case. No. 6:20-CV-00200-ADA, Affidavit of Service, Apr. 7, 2020, 1 page.

*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Plaintiff's First Amended Complaint for Patent Infringement and Jury Demand, Jun. 4, 2020, 11 pages.

(56) References Cited

OTHER PUBLICATIONS

*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 26, Defendant Cizion, LLC d/b/a Vulcan Industrial Manufacturing, LLC's Motion to Dismiss or Transfer, Jul. 22, 2020, 10 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Opposed Motion to Stay Litigation Pending the Outcome of the Pending Post-Grant Review Proceeding Before the Patent Trial and Appeal Board, Jul. 31, 2020, 14 pages.
*Kerr Machine Co.*, v *Vulcan Industrial Holdings, LLC*, Case No. 6:20-CV-00200-ADA, Plaintiff's Preliminary Infringement Contentions, May 22, 2020, 50 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Preliminary Invalidity Contentions, Aug. 13, 2020, 29 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 34, Scheduling Order, Aug. 11, 2020, 3 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 38, Plaintiff's Second Amended Complaint for Patent Infringement and Jury Demand, Sep. 25, 2020, 11 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 5, Standing Order regarding Scheduled Hearings In Civil Cases in Light of Chief Judge Garcia's 24 Amended Order, Mar. 24, 2020, 4 pages.
*Kerr Machine Co.*, v *Vulcan Industrial Holdings, LLC, Vulcan Energy Services, LLC, and Cizion, LLC d/b/a/ Vulcan Industrial Manufacturing*, Civil Docket for Case No. 6:20-cv-00200-ADA, accessed Sep. 11, 2020, 7 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 54, Claim Construction Order, Dec. 3, 2020, 3 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Docket Entry, Aug. 2, 2020, 1 page.
*Kerr Machine Co.*, v *Vulcan Industrial Holdings, LLC*, Case No. 6:20-CV-00200, Document 1, Plaintiff's Original Complaint for Patent Infringement and Jury Demand, Mar. 19, 2020, 39 pages.
*Adriana del Rocio Barberena-Rovira, et al.*, v *Kuiper Dairy, LLC, et al.*, Case No. 6:20-CV-00250-ADA-JCM, Document 20, Scheduling Order, Jul. 22, 2020, 4 pages.
*Acquanlan Deonshay Harris* v. *Cenlar, FSB*, Case No. 6:20-CV-00271-ADA-JCM, Document 13, Scheduling Order, Aug. 20, 2020, 4 pages.
Senior Living Properties, LLC c. Ironshore Speciality, Insurance Company, Case No. 6:20-CV-00282-ADA-JCM, Document 12, Scheduling Order, Jul. 7, 2020, 4 pages.
*Dionne Bracken, Individually and as Next Friend of A.M.B.*, v *Michael D. Ashcraft and Envirovac Waste Transport Systems, Inc.*, Case No. 6:20-CV-00308-ADA-JCM, Document 17, Scheduling Order, Jul. 28, 2020, 4 pages.
*Kendra Coufal* v. *Roger Lee Thomas and Apple Logistics, Inc.*, Case No. 6:20-CV-00356-ADA-JCM, Document 12, Scheduling Order, Jul. 28, 2020, 4 pages.
*Tipton International, Inc.*, v. *Vetbizcorp, LLC and Samuel Cody*, Case No. 6:20-CV-00554-ADA-JCM, Document 8, Scheduling Order, Aug. 20, 2020, 4 pages.
*Dynaenergetics GmbH & Co. KG and Dynaenergetics US, Inc.*, v. *Hunting Titan, Ltd.; Hunting Titan, Inc.; and Hunting Energy Services, Inc.*, Case No. H-17-3784, Order, Sep. 4, 2020, 2 pages.

Slip Opinion, In re Sand Revolution LLC, Case No. 2020-00145 (Fed. Cir. Sep. 28, 2020), 3 pages.
In re Vulcan Industrial Holdings, LLC, Case No. 2020-00151 (Fed. Cir. Sep. 29, 2020), Petition for Writ of Mandamus, 43 pages.
*Densys Ltd.*, v. *3Shape Trios A/S and 3Shape A/S*, Case No. WA:19-CV-00680-ADA, Document 27, Scheduling Order, Apr. 8, 2020, 4 pages.
*Kerr Machine Co.* vs. *Vulcan Industrial Holdings, LLC*, Case No. WA:20-CV-00200-ADA, Order Setting Markman Hearing, May 29, 2020, 1 page.
Sur-Lock Liner Retention System—Product Brochure (p. 16) (Year: 2017).
Sur-Lock Liner Retention System—Video (https://premiumoilfield.com/performance-enhancements/sur-lock/sur-lock-liner-retention-system.html) (https://www.youtube.com/watch?v=6NZGeD5NkF8) (Year: 2017).
U.S. Appl. No. 17/241,680 titled "Fluid End and Center Feed Suction Manifold" filed Apr. 27, 2021.
U.S. Appl. No. 16/814,267, 194 pages.
U.S. Appl. No. 17/120,121, 110 pages.
U.S. Appl. No. 62/234,483, 45 pages.
U.S. Appl. No. 62/315,343, 41 pages.
U.S. Appl. No. 62/318,542, 44 pages.
U.S. Appl. No. 62/346,915, 41 pages.
U.S. Appl. No. 62/379,462, 24 pages.
"Flush Free Sealing Benefits," Oct. 3, 2011, http://empoweringpumps.com/flush-free-sealing-benefits/, accessed May 9, 2020, 5 pages.
Gardner Denver, Well Servicing Pump Model GD-3000—Operating and Service Manual, Apr. 2011, 44 pages.
Gardner Denver, Well Servicing Pump Model GD-1000Q—Fluid End Parts List, Sep. 2011, 24 pages.
Gardner Denver, Well Servicing Pump Model HD-2250—Operating and Service Manual, Jan. 2005, 44 pages.
Cutting Tool Engineering, "Groove milling," Aug. 1, 2012, https://www.ctemag.cojm/news/articles/groove-milling, accessed May 13, 2020, 11 pages.
Vargususa, "Groovex Innovative Grooving Solutions—Groove Milling," Dec. 12, 2011, http://www.youtube.com/watch?v=vrFxHJUXjvk, 68 pages.
Kerr Pumps, Kerr triplex pump km3250bcb 10,000 psi @ 5.1 gmp, Feb. 2, 2021, http://imged.com/kerr-triplex-pump-km3250bcb-10-000-psi-5-1-gmp-8234739.html, 2 pages.
Lex Machina, Motion Metrics Report for 834 orders issued by District Judge Alan D Albright (ADA) in 1,603 cases from the Search for federal district court cases before Judge Alan D Albright, https://law.lexmachina.com/motions/motion_metrics?cases_key=yyix9Y8-k2k, generated on Sep. 23, 2020, 1 page.
Jonathan Maes, "Machining Square Inside Corners: Conquer the Nightmare!," accessed Sep. 8, 2020, https://makeitfrommetal.com/machining-square-inside-corners-the-night . . . , 22 pages.
Ross Mackay, "Process Engineering: Properly seal that pump," May 17, 2005, https://www.chemicalprocessing.com/articles/2005/465, 11 pages.
MSI Dixie Iron Works, Ltd., MSI QI-1000 Technical Manual for 1000 HP Quintuplex MSI QI-1000 Pump, Feb. 21, 2004, 90 pages.
MSI, Product Listing and Pricing, accessed Mar. 8, 2016, 19 pages.
National Oilwell Varco, 267Q-6M Quinuplex Plunger Pump: Parts List, Jul. 21, 2008, 13 pages.
Oil and Gas Well Servicing, Audit Procedures for Oil and Gas Well Servicing, May 2010, Texas Comptroller of Public Accounts, Audit Division, 68 pages.
Tony Atkins and Marcel Escudier, Oxford Dictionary of Mechanical Engineering, Oxford University Press, 2013, 10 pages.
Parker Hannifin Corporation and Autoclave Engineers, Technical Information, 2016, 16 pages.
Girdhar, Moniz and Mackay, "Chapter 5.4 Centrifugal pump design," Plant and Process Engineering 360, 2010, pp. 519-536.
Parker Hannifin Corporation, PolyPak Seals for Hydraulic Applications Catalog EPS 5370_PolyPak, 2015, 38 pages.
Paresh Girdhar and Octo Moniz, "Practical Centrifugal Pumps—Design. Operation and Maintenance," Newnes, 2005, 33 pages.

(56) References Cited

OTHER PUBLICATIONS

Reinhard Preiss, "Stress concentration factors of flat end to cylindrical shell connection with a fillet or stress relief groove subjected to internal pressure," 1997, Int. J. Pres. Ves. & Piping, vol. 73, pp. 183-190.
Eaton Aerospace Group, Resilient Metallic Seals, TF100-35D, Oct. 2013, 60 pages.
Scott McKeown, "District Court Trial Dates Tend to Slip After PTAB Discretionary Denials—Patents Post-Grant," Jul. 24, 2020, Ropes & Gray, accessed Sep. 23, 2020, 3 pages.
Ricky Smith and R. Keith Mobley, "Rules of Thumb for Maintenance and Reliability Engineers—Chapter 14: Packing and Seals," Elsevier, 2008, pp. 239-250.
Schlumberger, Jet Manual 02—Reciprocating Pumps, Aug. 7, 2015, 63 pages.
Schlumberger, Treating Equipment Manual: Fluid Ends, Section 10, Apr. 2000, 87 pages.
SPM Oil & Gas, SPM QEM 3000 Frac Pump, 2021, 4 pages.
Supplemental Declaration of Steven M. Tipton, Ph.D., P.E.—Case PGR2020-00065, U.S. Pat. No. 10,591,070, Mar. 2, 2021, 35 pages.
Servagroup, TPD 600 Triplex Pump Brochure, Mar. 24, 2011, 2 pages.
Utex Industries, Inc., Well Service Products Catalog, Jun. 2017, 51 pages.
Utex Industries, Inc., Well Service Packing—Packing Assemblies Complete & Replacement, May 2013, 40 pages.
Vargus Ltd., Groove Milling High Precision Tools for Groove Milling, Dec. 2012, pp. 2-22.
Flowserve, "Dynamic Balance Plug Valve and Double DB Plug Valve: Installation, Operation and Maintenance," 2011, https://www.flowserve.com/sites/default/files/2016-07/NVENIM2005-00_0.pdf, 36 pages.
Weir Oil & Gas, "SPM Well Service Pumps & Flow Control Products TWS600S Fluid End Operation Instruction and Service Manual," Feb. 27, 2017, https://www.global.weir/assets/files/oil%20and%20gas%20ebrochures/manuals/ws600s-fluid-end-2p121260.pdf, 41 pages.
White Star Pump Co., "Maintenance Manual: Triplex Pump WS-1300/1600," 2005, http://www.whitestarpump.com/ES/docs/user_t.pdf, 45 pages.
KerrPumps, "Super Stainless Steel Better Than The Best," http://kerrpumps.com/superstainless?gclid=EAlaIQobChMlg470482q6wIVilTICh2XPA-qEAAYASAAEgKrxPD_BwE, 2013, last accessed: Aug. 21, 2020, 6 bages.
KerrPumps, "Frac One Pumps—Fluid End—Fracing," http://kerrpumps.com/fracone, 2013, last accessed: Aug. 21, 2020, 3 pages.
KerrPumps, "KerrPumps—Frac Pump & Mud Pump Fluid End—Fluid End Pump," http://kerrpumps.com/fluidends, 2013, last accessed: Aug. 21, 2020, 6 pages.
Vulcan Industrial, "Vulcan," http://www.vulcanindustrial.com/, 2019, last accessed: Aug. 21, 2020, 3 pages.
Vulcan Industrial, "Vulcan," http://www.vulcanindustrial.com/fluidends/, 2019, last accessed: Aug. 21, 2020, 3 pages.
COVERT Manufacturing, Inc., "Fluid End Block: Covert Manufacturing", (site visited Jul. 30, 2021), covertmfg.com, URL: <http://www.covertmfg.com/our-capabilities/fluid-end-block/> (Year: 2021).
Kerr Pumps, "the most advanced fluid ends", (site visited Aug. 5, 2021), Kerrpumps.com, URL: <http://kerrpumps.com/fluidends> (Year: 2021).
Shandong Baorun, 2250 Triplex Plunger Pump Fluid End Exchangeable with Spm, (site visited Aug. 5, 2021), made-in-china.com, URL: <https://sdbaorun.en.made-in-china.com/product/wNixIDXYrshL/China-2250-Triplex-Plunger-Pump-Fluid-End-Exchangeable-with-Spm.html> (Year: 2021).
John Miller, "The Reciprocating Pump, Theory, Design and Use," 1995, 2nd Edition, Krieger Publishing Company, Malabar, Florida, 1 page.

"QIH-1000 HP Quintuplex," Dixie Iron Works, 2017, https://web.archive.org/web/20171031221150/http:/www.diwmsi.com/pumping/qi-1000/.
Technical Manual MSI Hybrid Well Service Pump Triplex and Quintuplex Models, Dixie Iron Works, Mar. 12, 2019, 88 pages.
Carpenter, "CarTech Ferrium C61 Data Sheet," 2015, 2 pages.
The American Heritage Dictionary, Second College Edition, 1982, 6 pages.
Matthew Bultman, "Judge in West Texas Patent Hot Spot Issues Revised Guidelines," Sep. 23, 2020, Bloomberg Law News, 3 pages.
David L. Taylor, "Machine Trades Blueprint Reading: Second Edition," 2005, 3 pages.
Blume, U.S. Pat. No. 6,544,012, issued Apr. 8, 2003, Fig. 12A.
Caterpillar, "Cat Fluid Ends For Well Stimulation Pumps," 2015, 2 pages.
Collins English Dictionary, "annular," https://www.collinsdictionary.com/us/dictionary/english/annular, 2021, 4 pages.
Collins English Dictionary, "circumference," https://www.collinsdictionary.com/us/dictionary/english/circumference, 2021, 7 pages.
Collins English Dictionary, "plug," https://www.collinsdictionary.com/us/dictionary/english/plug, 2021, 17 pages.
Collins English Dictionary, "profile," https://www.collinsdictionary.com/us/dictionary/english/profile, 2021, 10 pages.
Collins English Dictionary, "space," https://www.collinsdictionary.com/us/dictionary/english/space, 2021, 13 pages.
Collins English Dictionary, "stairstep," https://www.collinsdictionary.com/us/dictionary/english/stairstep, 2021, 3 pages.
Congressional Record—Extensions of Remarks, Apr. 18, 2007, pp. E773-E775.
Congressional Record, Mar. 7, 2011, 31 pages.
"Declaration of Steven M. Tipton, Ph.D., P.E., Submitted with Patent Owner's Preliminary Response," Sep. 11, 2020, 155 pages.
"Declaration of William D. Marscher, P.E.—U.S. Pat. No. 10,914,171," Feb. 11, 2021, 308 pages.
"Declaration of William D. Marscher, P.E.—U.S. Pat. No. 10,591,070," May 25, 2020, 209 pages.
Email dated Sep. 22, 2020 in PGR2020-00065, 3 pages.
Email dated Sep. 25, 2020 in Kerr Machine v Vulcan Industrial Holdings, 1 page.
U.S. Pat. No. 10,288,178, 353 pages.
U.S. Pat. No. 10,519,950, 142 pages.
U.S. Pat. No. 10,591,070, 168 pages.
U.S. Appl. No. 16/722,139, 104 pages.
U.S. Appl. No. 13/773,271, 250 pages.
U.S. Appl. No. 15/719,124, 183 pages.
Karolczuk et al., "Application of the Gaussian Process for Fatigue Life Prediction Under Multiaxial Loading", Mechanical Systems and Signal Processing 167 (2022), Nov. 14, 2021.
Carraro et al. "A Damage Based Model for Crack Initiation in Unidirectional Composites Under Multiaxial Cyclic Loading", Composite Science and Technology 99 (2014), 154-163, May 16, 2014.
Albinmousa et al., "Cyclic Axial and Cyclic Torsional Behaviour of Extruded AZ31B Magnesium Alloy", International Journal of Fatigue 33 (2011), 1403-1416, 2011.
Horstemeyer et al., "Universal Material Constants For Multistage Fatigue (MSF) Modeling of the Process-Structure-Property (PSP) Relations of A000, 2000, 5000, and 7000 Series Aluminum Alloys", Integrating Materials and Manufacturing Innovation, vol. 9 (2020), 157-180, Jun. 22, 2020.
Guan et al., "Model Selection, Updating, and Averaging for Probabilistic Fatigue Damage Prognosis", Journal of Structural Safety, Mar. 11, 2011.
Frick et al., "Orientation-Independent Pseudoelasticity in Small-Scale Niti Compression Pillars", Scripta Materialia 59(12), 7-10, 2008.
Naghipour et al., "Fatigue Analysis of Notched Laminates: a Time-Efficient Macro-Mechanical Approach", Ohio Aerospace Institute, Cleveland, 2016.

(56) References Cited

OTHER PUBLICATIONS

International Search Report and Written Opinion for international application No. PCT/US2023/066143, dated Aug. 28, 2023.

\* cited by examiner

US 11,920,684 B1

MECHANICALLY OR HYBRID MOUNTED VALVE SEAT

TECHNICAL FIELD

Embodiments of the subject matter disclosed herein generally relate to pump systems, and in particular to valve assemblies used in pump systems.

BACKGROUND

Pumping systems may be used in a variety of applications, such as industrial applications where pumping systems are used to elevate a working fluid pressure. One such application is hydraulic fracturing systems, where pumps are used to increase a fluid pressure of a working fluid (e.g., fracturing fluid, slurry, etc.) for injection into an underground formation. The working fluid may include particulates, which are injected into fissures of the formation. When the fluid is removed from the formation, the particulates remain and "prop" open the fissures, facilitating flow of oil and gas. In many applications, reciprocating pumps are used where a fluid is introduced into a fluid end inlet passage and out through an outlet passage. A plunger reciprocates within a bore to add energy to the fluid.

SUMMARY

Applicant recognized the problems noted above herein and conceived and developed embodiments of systems and methods, according to the present disclosure, for valve assemblies, and in various embodiments, fluid ends containing one or more valve seats.

In accordance with one or more embodiments, a valve seat for use within a hydraulic fracturing pump includes a first portion including a strike face for interacting with a reciprocating component associated with the valve seat. The valve seat also includes a second portion having a recess to receive at least a portion of the first portion, the first portion being coupled to the second portion using a hybrid joining method that includes both a mechanical fastener to secure the first portion to the second portion and a joining process to secure the first portion to the second portion.

In accordance with another embodiment, a valve assembly includes a valve member configured to reciprocate within a bore. The valve assembly also includes a valve seat having a strike face, the strike face positioned to contact the valve member. The valve seat includes a first portion positioned at an axially upward portion of the valve seat to form at least a portion of the strike face, the first portion formed from a first material. The valve seat also includes a second portion positioned at an axially lower portion of the valve seat, the first portion being coupled to the second portion, the second portion formed from a second material different from the first material, wherein the first portion is coupled to the second portion using at least two different coupling mechanisms.

In accordance with another embodiment, a pump assembly includes a fluid end block having a first bore, a second bore, a third bore, and a fourth bore, the first bore extending from an external surface to an internal chamber, and the second bore extending from an opposite external surface to the internal chamber, the third and fourth bore extending independently toward the internal chamber, the internal chamber connecting each of the first bore, the second bore, the third bore, and the fourth bore. The pump assembly also includes a valve assembly arranged in at least one of the first bore or the second bore. The valve assembly includes a valve member configured to reciprocate within a bore and a valve seat having a strike face, the strike face positioned to contact the valve member. The valve seat includes a first portion forming at least a portion of the strike face, the first portion formed from a first material and a second portion formed from a second material, different from the first material, coupled to the first portion using at least two different coupling mechanisms.

In accordance with another embodiment, a method for forming a valve seat includes providing a first portion formed from a first material. The method also includes providing a second portion formed from a second material. The method further includes positioning the first portion within a recess of the second portion. The method also includes coupling the first portion to the second portion using a mechanical fastener. The method includes coupling the first portion to the second portion using a joining process.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

Figure 1:
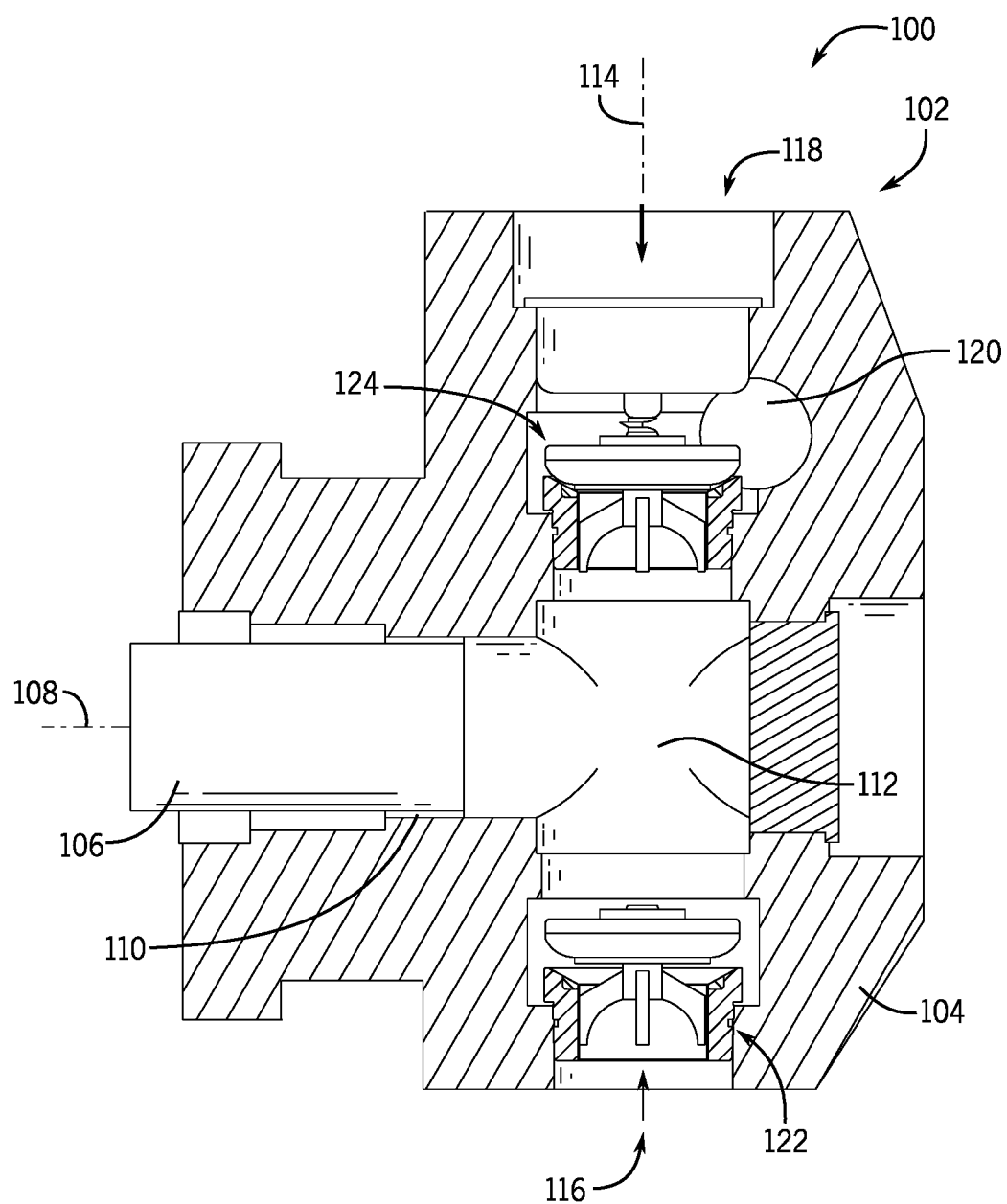
FIG. 1 is a schematic cross-sectional view of a prior art pump assembly, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, like reference numerals may be used for like components, but such use is for convenience purposes and not intended to limit the scope of the present disclosure. Moreover, use of terms such as substantially or approximately may refer to +1-10 percent.

Embodiments of the present disclosure are directed toward valve assembly configurations where one or more portions of a valve seat may be, at least in part, mechanically coupled together. For example, embodiments may be directed toward configurations where a valve seat, or portions thereof, are mechanically mounted together, such as mounting a top portion to a bottom portion. Various embodiments may incorporate new attachment systems and methods to couple a hard valve seat, such as a carbide, to a steel base. Furthermore, embodiments may also include hybrid mounting methods, such as mixing both mechanical mounting systems with other joining processes (e.g., welding, brazing, soldering, adhesive bonding, etc.). By way of example only, systems and methods may include a mechanical mounting system, such as one or more fasteners, that is also further coupled using an additional mounting method such as a thermal shrink-fit, brazing, cementing, or the like. Various embodiments include mechanical mounting methods such as clamping, wedges, dovetails, screw mounting, lock pins, threaded pins, external mounting rings, sleeves, and the like. These mechanical mounting methods may reduce de-bonding between different components of the valve seat, which may have different material properties, thereby improving a useful life of valve seats.

Systems and methods may be directed toward overcoming problems with valves and valve seats used with pumping applications, such as hydraulic fracturing. Valves and valve seats are critical mating parts/tools of a fracture pump system that suctions and discharges high pressure fracture fluid (e.g., at a pressure greater than the strength of the rock formation, which may be up to 15,000 psi or more) into gas and oil wells to fracture the tight rock formations for oil production. The suction and discharge movement of the hard proppant (e.g., sand or ceramic particles) loaded fracturing fluids by the pump puts the valves and seats under constant pulsing hydraulic pressure (e.g., cyclic hydraulic pressure between 100 psi to 15,000 psi) and severe abrasive plowing and wear. The fracturing fluids are also often corrosive, which further accelerates the failures of the tools. The short lifetime of these consumable parts causes the fracture fleets to shut down the frac pumps and replace the consumables parts, leading to high non-productive time and maintenance cost. Recently, ductile medium carbon steel base with hard carbides (e.g. WC+Co) insert seal faces have attracted interest with fracturing pumps. Though the hard carbide inserts increase abrasive resistance of the seat seal faces and extended seat lifetime in some degree, brittle shattering or surface fatigue cracking of the hard surface, and carbide insert de-bonding from steel base occurs, causing erosion and washing out of the valve seats. The root causes attributing to the de-bonding from the steel base are believed to be that the sharp mismatch of thermal or mechanical properties, such as thermal expansion coefficient and Young's modulus, between the hard-facing layers and steel base. Embodiments of the present disclosure address these problems by integrating mechanical coupling methods to join these dissimilar valve seat components. Various embodiments provide for mechanical or hybrid fastening systems that address these problems and provide valve seats with the resistance of hard carbide without the risk of de-bonding.

FIG. 1 is a schematic cross-sectional view of a prior art pump assembly 100, which may also be referred to as a reciprocating pump assembly and/or a reciprocating pump. The pump assembly 100 may be utilized during hydraulic fracturing operations, among other operations, where a working fluid (e.g., fracturing fluid, slurry, etc.) is introduced into the pump and energy is added to the working fluid to increase a pressure of the working fluid. Fracturing fluid, by way of example only, may include corrosives and also particulates, such as sand or ceramics, which are utilized during fracturing operations. These corrosives and particulates cause erosion within the pump assembly 100, which may undesirably affect fracturing operations and lead to down times to replace various components. Additionally, the fracturing fluids may include corrosive acids and the like, which may wear down components of the pump assembly 100.

It should be appreciated that various components of the pump assembly 100 have been removed for clarity with the following discussion. For example, a power end has been removed in favor of focusing on the illustrated fluid end 102 of the pump assembly 100. The power end may include a crankshaft that is driven by an engine or motor to facilitate operations. The fluid end 102 includes a fluid end block 104 that may house one or more components discussed herein. A plunger rod 106 is driven (e.g., via the crankshaft) to reciprocate within the fluid end block 104 along a plunger axis 108. The plunger rod 106 is positioned within a bore 110 extending through at least a portion of the fluid end block 104. The illustrated bore 110 is arranged along the plunger axis 108 (e.g., first axis) and intersects a pressure chamber 112, which is arranged along a pressure chamber axis 114 (e.g., second axis), which is positioned substantially perpendicular to the plunger axis 108. It should be appreciated that the pump assembly 100 may include multiple plunger rod and pressure chamber arrangements, which may be referred to as a plunger throw. For example, the pump assembly 100 may be a triplex pump, quadplex pump, quintuplex pump, and the like.

The illustrated fluid end block 104 includes an inlet passage 116 and an outlet passage 118, which are generally coaxial and arranged along the pressure chamber axis 114. In other words, the inlet passage 116 and the outlet chamber 118 are axially aligned with respect to one another and/or the pressure chamber 112. In various embodiments, fluid enters the pressure chamber 112 via the inlet passage 116, for example on an up stroke of the plunger rod 106, and is driven out of the pressure chamber 112 to an outlet passage 120, for example on a down stroke of the plunger 106.

Respective valve assemblies 122, 124 are arranged within the inlet passage 116 and the outlet chamber 118. These valve assemblies 122, 124 are spring loaded in the illustrated embodiment, but it should be appreciated that such an arrangement is for illustrative purposes only. In operation, a differential pressure may drive movement of the valve assemblies. For example, as the plunger rod 106 is on the upstroke, pressure at the inlet passage 116 may overcome the spring force of the valve assembly 122, thereby driving fluid into the pressure chamber 112. However, on the down stroke, the valve assembly 122 may be driven to a closed position, while the spring force of the valve assembly 124 is overcome, thereby enabling the fluid to exit via the outlet passage 120.

As will be described below, the vale assemblies 122, 124 may undergo hundreds of hours of operation and, eventually, will wear and be replaced. These are considered to be consumable parts, but increasing a useful life of the parts is desirable in the industry in order to reduce maintenance costs, reduce shutdown times for replacements, and also to provide more reliable operations. Systems and methods of the present disclosure may provide for improved valve seats that incorporate mechanical or hybrid coupling mechanisms (e.g., a mechanical coupling used along with a joining process) in order to reduce a likelihood of failure at a coupling between dissimilar metallic components. In this manner, benefits of hard facing materials may be incorporated into the system while maintaining reliability.

Figure 2:
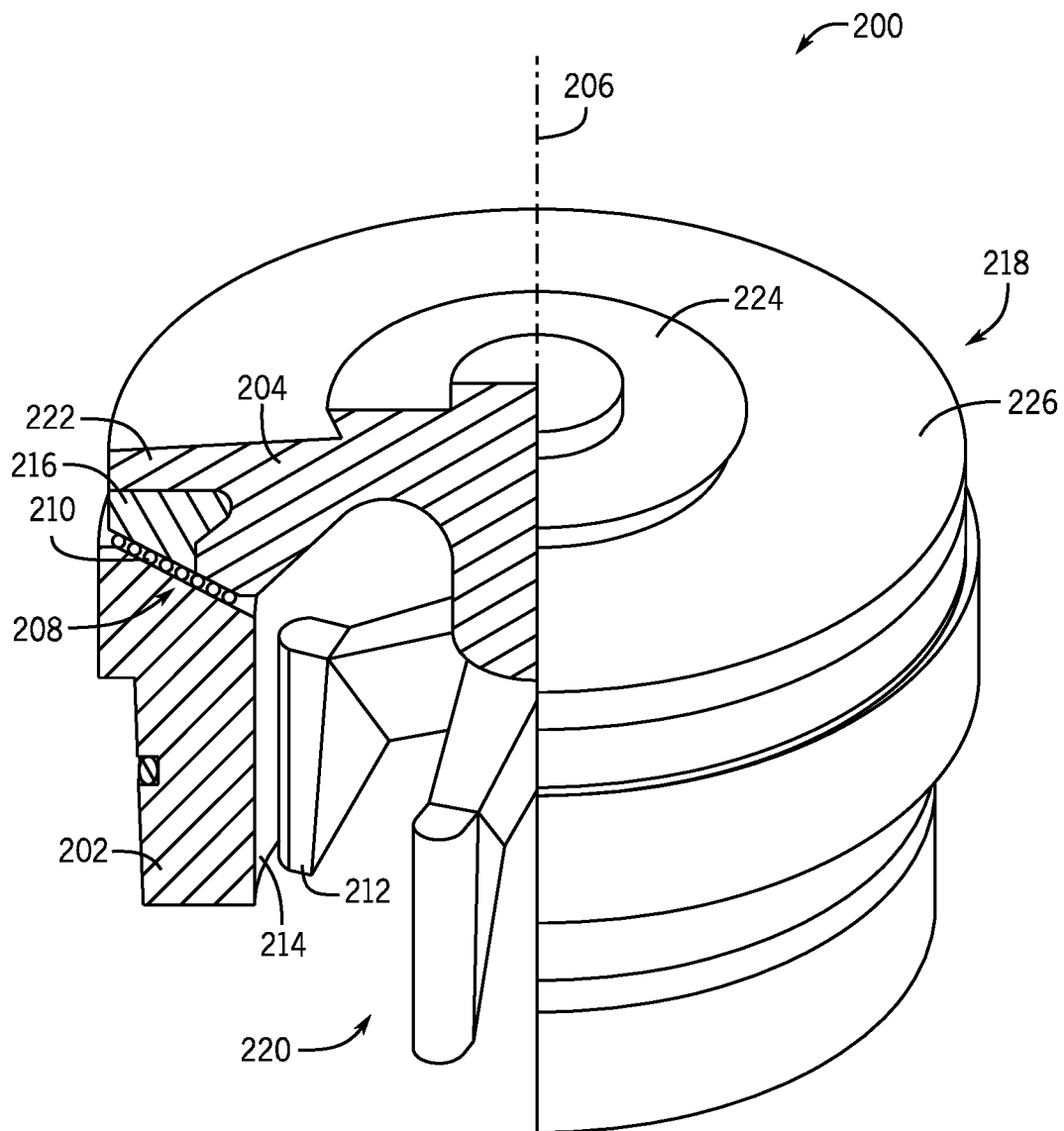
FIG. 2 is a cut-away perspective view of a prior art valve assembly, in accordance with embodiments of the present disclosure.

FIG. 2 is a schematic cut away view of a prior art valve assembly 200, such as the valve assemblies 122, 124, which may be utilized with a pump assembly. The illustrated valve assembly 200 includes a valve seat 202 and a valve member 204 (e.g., a valve body). It should be appreciated that the valve seat 202 may refer to the structure of the seat and may include multiple constituent components, such as a body, a strike face, and the like. In operation, the valve member 204 reciprocates along a valve axis 206, which may correspond to the pressure chamber axis 114, such that the valve member 204 moves into and out of contact with at least a portion of the valve seat 202. In the illustrated embodiment, particulates 208 have accumulated along the valve seat 202, for example at a strike face 210 (e.g., a contact face). Repeated contact from the valve member 204 may drive the particulates 208 into the strike face 210, causing scarring or other damage. Additionally, corrosive fluids may contact other portions of the valve seat 202, in addition to the strike face 210. Damage to the valve seat 202 may cause the sealing capability of the valve assembly 200 to degrade, thereby reducing the effectiveness of the pump assembly.

In various embodiments, guide legs 212 of the valve member 204 may also lead to damage to various portions of the valve seat 202. For example, in the illustrated embodiment, the guide legs 212 extend into a bore 214 of the valve seat 202. Due to the presence of the corrosive fluid and/or the particulates, damage may occur along the bore 214, such as scarring. As a result, the pump assembly may be taken out of service for repairs, which may be expensive and also contribute to non-productive time at the well site.

As noted, operation of the illustrated valve assembly 200 may be, at least partially, spring loaded, where the spring has been removed in FIG. 2, to drive the valve member 204 toward the illustrated closed position where a sealing element 216 is driven toward the valve seat 202. In this example, the valve member 204 may include a top portion 218 and a bottom portion 220, where the top portion 218 may correspond to the region above a shoulder 222 and the bottom portion 220 may correspond to a region below the shoulder 222. It should be appreciated that this delineation is provided by way of example for clarity and conciseness and that different portions of the valve member 204 may correspond to the top and bottom portions 218, 220. In this example, a boss 224 is included along the top portion 218 that corresponds to a raised area that extends axially away from a top surface 226. The boss 224 may be viewed as an extension or extrusion extending away from the top surface 226 and may be used to center the spring (not pictured) or as a knob or handle for retrieval and placement of the valve member 204. Additionally, the boss 224 may be used as a hard stop to limit total spring compression.

Various embodiments of the present disclosure may be directed toward improved valve seats 202 where a portion of the valve seat 202 may be formed from a first material and a second portion of the valve seat 202 may be formed from a second material, different from the first material. The second material may be used to form at least a portion of the strike face 210, which in various embodiments may be exposed to the particulates 208, corrosive fluids, and the like. As noted above, joining the dissimilar metals may cause de-bonding due to various different mechanical properties, which may lead to valve failures, shutdowns, lost time, and the like. As will be described below, systems and methods may incorporate mechanical and/or hybrid coupling methods in order to provide a hard, resistant strike face 210 while enabling use of a lower cost material for the remainder of the valve seat 202.

FIGS. 3A-3F illustrate embodiments of a valve seat 300 (e.g., valve seat assembly) that may be utilized to overcome one or more deficiencies of prior art valve seats. As will be described below, one or more embodiments may include mechanical fasteners (e.g., a pin, a dowel, a threaded fitting, etc.) to secure a first portion (e.g., a top portion) to a second portion (e.g., a body portion). Furthermore, arrangements may provide for different regions of the body portion to be covered by the first portion such that all or substantially all of the strike face is formed by the first portion. It should be appreciated that various features of the embodiments described herein may be incorporated with one another and are not limited to the arrangements shown. For example, the valve seat 300 may include features described with other valve seats disclosed herein.

It should be appreciated that various components of the valve seat 300 may be described with respect to various embodiments within the present disclosure. One or more of these features may be used between embodiments, and as a result, like numbers may be used for convenience and clarity. It should be appreciated that like numbering or the like of lack numbering does not indicate that components are distinct or may not be used with other embodiments of the present disclosure. Moreover, one or more features from different embodiments may be used in place or, or along with, other features from other embodiments unless otherwise specifically stated.

Figure 3A:
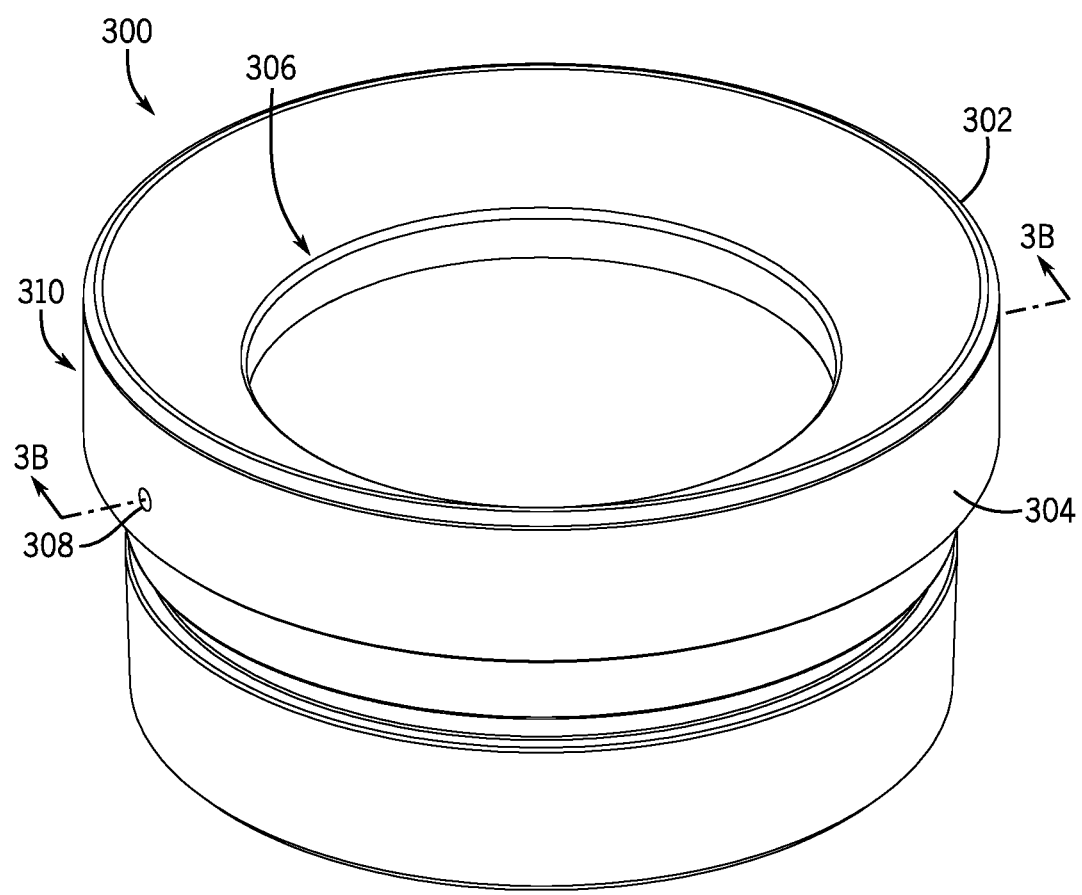
FIG. 3A is a perspective view of an embodiment of a valve seat, in accordance with embodiments of the present disclosure.

FIG. 3A is a perspective view of an embodiment of the valve seat 300 that includes a first portion 302 (e.g., a top portion) and a second portion 304 (e.g., a body portion, a bottom portion, etc.). In this example, a bore 306 extends through the both the first portion 302 and the second portion 304. As will be appreciated, the bore 306 may correspond to the bore 214 such that, in operation, the valve member 204 may reciprocate within the bore 306.

As shown in this example, apertures 308 are formed along a circumference 310 of the second portion 304. These apertures 308 are positioned at different circumferential positions in the illustrated embodiment. For example, the apertures may be equally spaced apart, with their spacing being based, at least in part, on a total number of apertures included. By way of example only, two apertures 308 may be spaced 180 degrees apart, three apertures 308 may be spaced 120 degrees apart, four apertures 308 may be spaced 90 degrees apart, and so forth. However, the spacing may not be equal in various other embodiments. Additionally, there may be more apertures that are not used, but provided for ease with alignment or otherwise arrangement components. Moreover, the number of apertures 308 may be particularly selected based on operating conditions, material properties, and the like. Accordingly, it should be appreciated that embodiments may be provided by way of example only and are not intended to limit the scope of the present disclosure.

As noted above, in a variety of embodiments the first portion 302 is formed from a different material than the second portion 304. For example, the first portion 302 may be a hard, resilient material, such as a carbide. In contrast, the second portion 304 may be a steel. It should be appreciated that other materials may be used within the scope of the present disclosure and that carbides and steels are provided by way of example only.

Figure 3B:
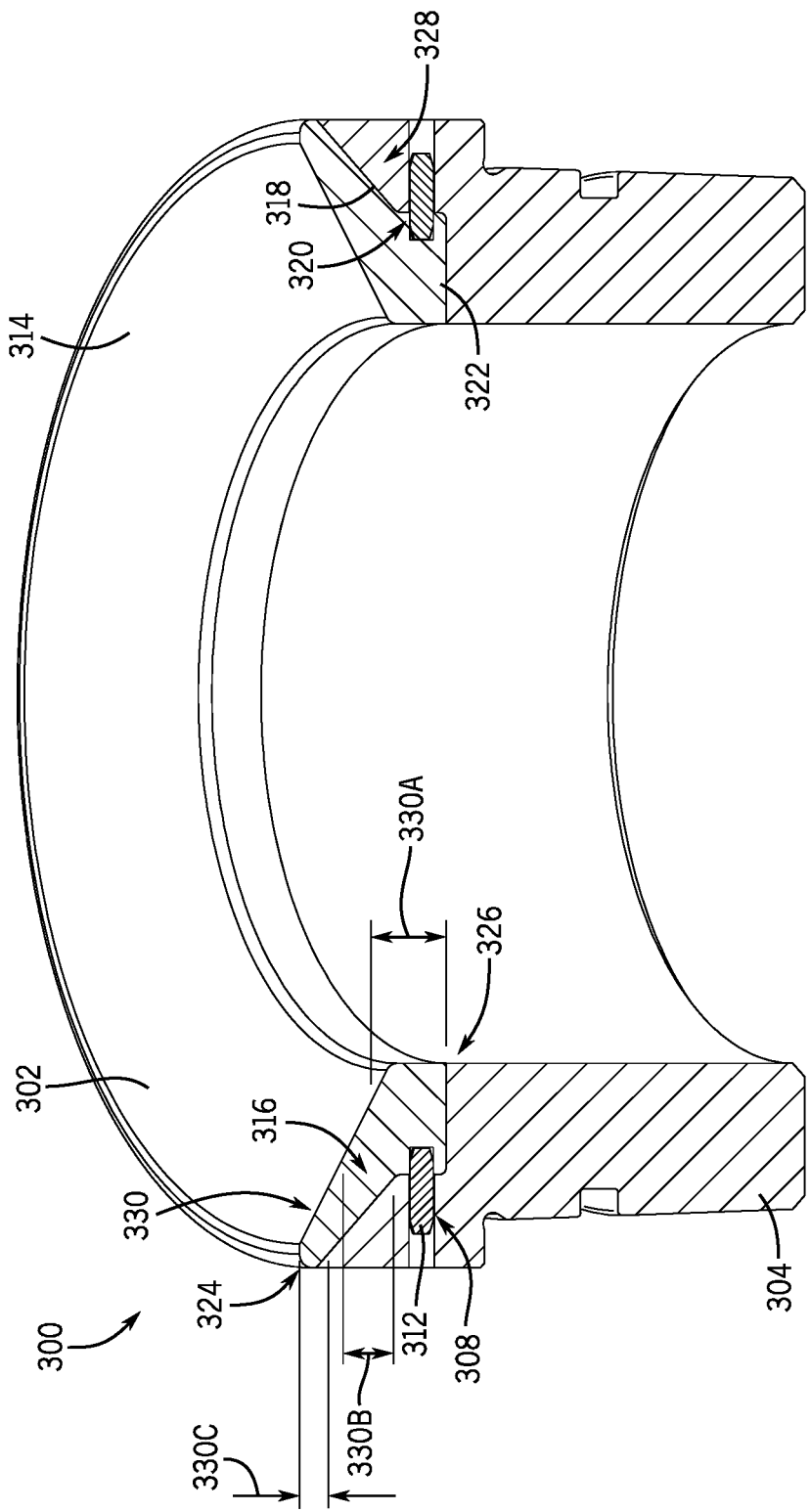
FIG. 3B is a sectional view of an embodiment of a valve seat taken along line 3B-3B, in accordance with embodiments of the present disclosure.

FIG. 3B is a sectional view of an embodiment of the valve seat 300 in which the first portion 302 is coupled to the second portion 304 via a fastener 312. As shown in this example, the apertures 308 extend through the second portion 304 and at least partially into the first portion 302 such that the fastener 312 may span between both the first portion 302 and the second portion 304. Accordingly, axial movement of the first portion 302 along the axis 206 is blocked.

In this example, the first portion 302 is shown to fully cover the second portion 304 such that from above, the second portion 304 is not visible. That is, from an upward position, the second portion 304 is not exposed. In over words, the first portion 302 may be said to fully overlap the second portion 304. It should be appreciated that this configuration is provided as an example and that, in other embodiments, at least a portion of the second portion 304 may be visible from above. For example, the first portion 302 may be used to form a strike face 314, such as the strike face 210, that is positioned to receive contact from a reciprocating valve member, such as the valve member 204. The first portion 302 includes a surface area and the strike face 314 may be less than the surface area. Accordingly, the first portion 302 may be sized to fit within a groove or recess of the second portion 304 such that at least a portion of the second portion 304 is exposed from the top, but so that the strike face 314 is still formed, at least in part, by the first portion 302.

In this example, the first portion 302 is positioned within a recessed portion 316 of the second portion 304. The illustrated recessed portion 316 includes a sloped region 318, a transition 320, and a planar region 322. It should be appreciated that this profile is for illustrated purposes and not intended to limit the scope of the present disclosure. For example, the sloped region 318 may be a continuous region from an outer diameter 324 to an inner diameter 326. Additionally, the transition 320 may be a gradual, sloped transition instead of a stepped region. Furthermore, the planar region 322 may be sloped in various embodiments. Furthermore, that may be additional regions, such as more slopes, more transitions, and more planar regions such that the profile for the first portion 302 may be a variety of different shapes conforming to and mating with a profile of the recessed portion 316.

Figure 3C:
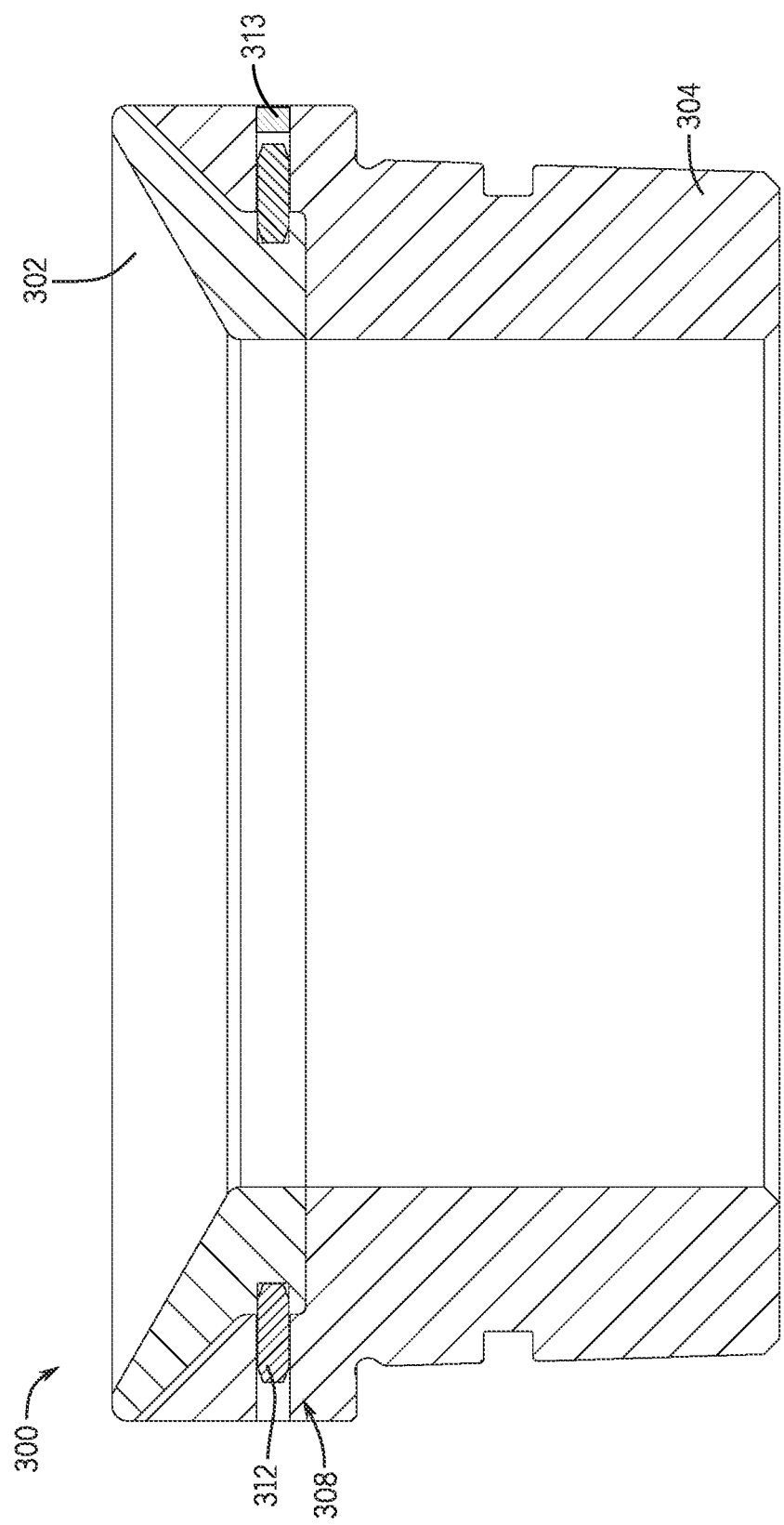
FIG. 3C is a cross-sectional view of an embodiment of a valve seat, in accordance with embodiments of the present disclosure.

In this example, the aperture 308 extends through the transition 320 and into the first portion 302. It should be appreciated that the aperture 308 may include two portions, a first aperture region 308A that extends through the first portion 302 and a second aperture region 308B that extends through the second portion 304, but for convenience, may collectively be referred to as just an aperture. The illustration location of the aperture 308 is provided as an example and the aperture 308 may extend through the sloped region 318, as an example. Furthermore, as is illustrated in FIG. 3C, various embodiments may include a plug, seal, or the like 313 positioned over the aperture 308 after the fastener 312 is inserted and/or before the fastener 312 is inserted. For example, the plug or seal 313 may include weld metal or an adhesive that is positioned within the aperture 308 to prevent the fastener 312 from backing out. Additionally, it should be appreciated that the aperture 308 may include further elements to maintain a position of the fastener 312, such as threads (that interact with mating threads), spring-loaded catches, detents, dogs, bayonet fittings, and the like. For example, the fastener 312 may be installed and then twisted so that lugs are aligned to prevent radial removal without twisting the fastener 312. Furthermore, in at least one embodiment, an outer diameter of the fastener 312 may be smaller than an aperture diameter to avoid tensile stresses.

In the illustrated embodiment, a portion of the second portion 304 forms a shoulder 328 positioned axially lower than at least a portion of the first portion 302. The illustrated shoulder 328 may receive a portion of a force acting on the first portion 302, for example, and may be positioned to strengthen or otherwise reinforce the first portion 302. In various embodiments, the shoulder 328 may be shaped or otherwise configured to facilitate positioning of the first portion 302 within the recessed portion 316. For example, while the illustrated shoulder 328 shows a downward slope toward the bore 306, in other embodiments the shoulder 328 may be planar or sloped away from the bore 306, or may include a catch or other feature to block movement of the first portion 302. For example, the shoulder 328 may include an extension that extends into a groove formed in the first portion 302. However, in various embodiments, the first portion 302 may not overlap or otherwise engage the shoulder 328. For example, at least a portion of the shoulder 328 may be exposed when looking down on the valve seal 300 such that no portion of the first portion 302 overlaps the shoulder 328.

In this example, a first portion thickness 330 is variable from the outer diameter 324 to the inner diameter 326. That is, the thickness is greater proximate the outer diameter 324 than proximate the inner diameter 326 in this example. In embodiments, the respective regions may be referred to as having a first thickness 330A, a second thickness 330B, a third thickness 330C, and so forth. These collective thicknesses 330 may refer to a distance normal from an interface between the first portion 302 and the second portion 304 to the strike face 314. Thickness may also refer to an axial distance between the strike face 314 and the interface along an axis of the valve seat 300. However, it should be appreciated that, in various embodiments, a profile of the recessed portion 316 may be such that the thickness 330 is substantially equal between the outer diameter 324 and the inner diameter 326, which in this equal are equal for the first portion 302 and the second portion 304.

FIG. 3C is a cross-sectional side view of an embodiment of the valve seat 300 illustrating the first portion 302 being fastened to the second portion 304 via the fasteners 312 extending through the aperture 308. As shown, the aperture 308 extends through both the first portion 302 and the second portion 304. Accordingly, the first portion 302 may be joined to the second portion 304 via the fastener 312.

In various embodiments, due to the temperatures, pressure, and generally extreme operating conditions for certain pumping systems, a hybrid approach may be taken to joining the first point 302 to the second portion 304 where an additional fastening method is used along with the mechanical fasteners described herein. By way of example only, the first portion 302 may also be press-fit, thermal shrink-fit, brazed, or cemented to the second portion 304, among other options. In various embodiments, the mechanical coupling may be used, at least in part, to position the first portion 302 on the second portion 304 and then the secondary coupling method selected for the hybrid approach may be used to finally secure the first portion 302 to the second portion 304. In this manner, extra protection may be provided to prevent de-bonding or separation between the first portion 302 and the second portion 304.

It should be appreciated that while the illustrated embodiment shows the first portion 302 as a continuous piece or ring, other embodiments may utilize the fasteners 312 with segmented portions that only extend a circumferential extent less than 360 degrees. That is, multiple segmented sections may form the first portion 302, where one or more segments are secured to the bottom portion via the fastener 312 and/or one or more additional coupling methods to utilize a hybrid joining process.

Figure 3D:
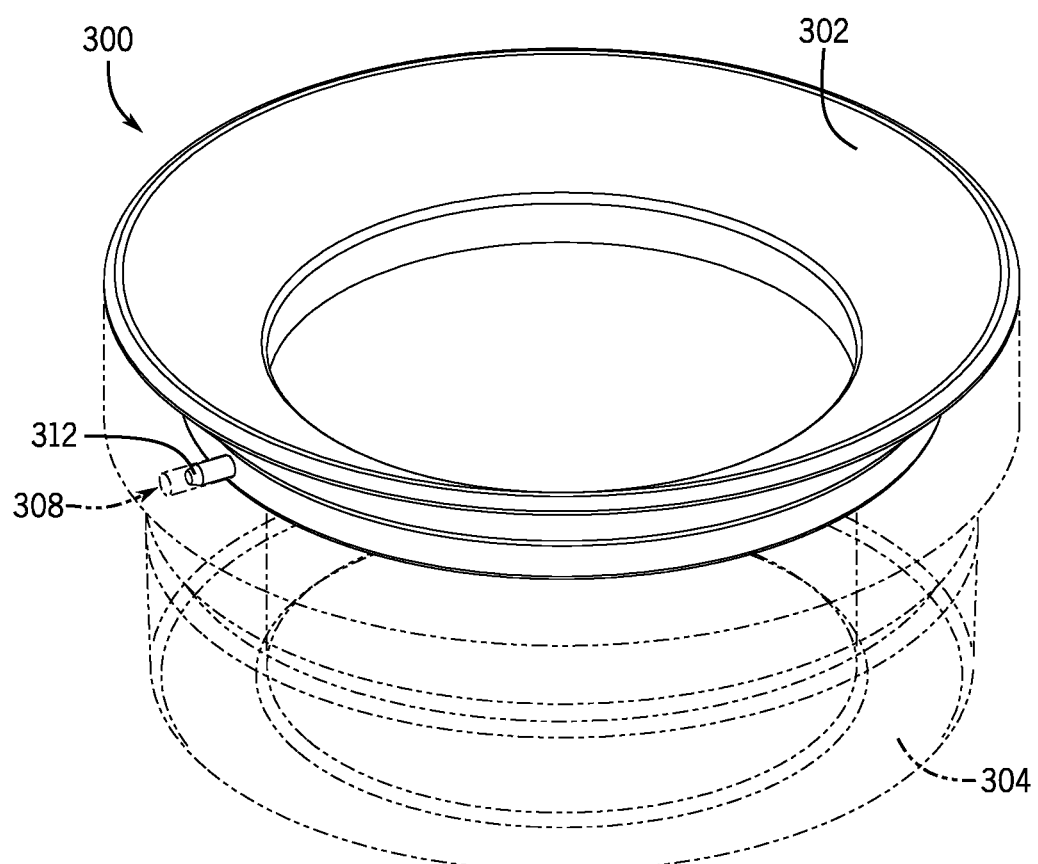
FIG. 3D is a perspective view of an embodiment of a valve seat, in accordance with embodiments of the present disclosure.

FIG. 3D is a perspective view of an embodiment of the valve seat 300 in which the second portion 304 is shown in a wire-line configuration and semi-transparent to illustrate the positioning of the first portion 302. As shown, the fastener 312 extends through the aperture 308 to join the first portion 302 to the second portion 304. In this example, only a single fastener 312 and aperture 308 combination is visible, but it should be appreciated that may be more or fewer fasteners 312 and/or apertures 308 utilized within the scope of the present disclosure. Furthermore, the second portion 304 may include more apertures than the first portion 302 such that certain apertures 308 in either the first portion 302 or the second portion 304 are not used.

Figure 3E:
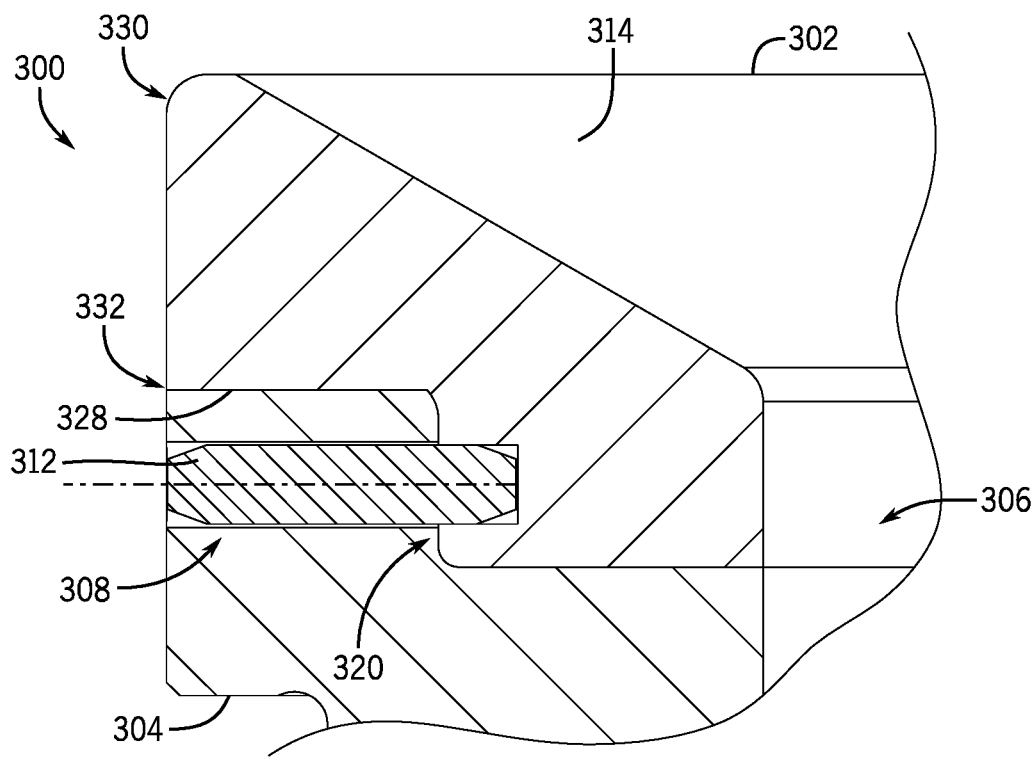
FIG. 3E is a cross-sectional view of an embodiment of a valve seat, in accordance with embodiments of the present disclosure.

FIG. 3E is a detailed cross-sectional view of the valve seat 300 in which an interface 332 (e.g., a profile) between the first portion 302 and the second portion 304 has a different configuration than that in, for example, FIG. 3C. In the illustrated embodiment, the shoulder 328 has a substantially flat or planar configuration, as opposed to the sloped configuration shown in FIG. 3C. As noted above, it should be appreciated that a shoulder angle may be particularly selected based on one or more design or manufacturing conditions, and as a result, the shoulder angle may be substantially flat (as shown in FIG. 3C), downwardly angled toward the bore 306 (as shown in FIG. 3C), or downwardly angled away from the bore 306 (not pictured), as well as various combinations thereof.

In this example, the thickness 330 is variable at different locations along a length of the strike face 314. For example, the downwardly sloped strike face 314 has a larger thickness 330 between the shoulder 328 than at the transition 320. That is, a distance extending from the shoulder 328 to the strike face 314 is greater along the shoulder 328 than at the transition 320. As noted, thickness 330 may vary or stay constant along the length of the strike face 314 and the illustrated embodiment is provided by way of non-limiting example.

As noted above with respect to FIG. 3C, the fastener 312 extends through the aperture 308, which is formed in both the first portion 302 and the second portion 304. In this example, the aperture 308 extends entirely through the shoulder 328. In at least one embodiment, the fastener 312 may be secured within the aperture 308 using one or more coupling mechanisms, such as threaded components, adhesives, weld metal, and the like.

Various systems and methods of the present embodiment may also be utilized with one or more hybrid coupling methods that include both a mechanical coupling component (e.g., the fastener 312) and a secondary coupling component (e.g., a chemical coupling component, a joining process, a different mechanical coupling component, etc.). For example, the first portion 302 may be secured to the second portion 304 via both the fastener 312 and a press fit operation. Alternatively, in various embodiments, the press fit operation may be replaced by one or more of a thermal shrinkage fit, a welded connection, adhesion joining, or the like. In this manner, a secure coupling between the first portion 302 and the second portion 304 is enabled while reducing a likelihood of de-bonding or disconnects due to differing material properties between the first portion 302 and the second portion 304.

Figure 3F:
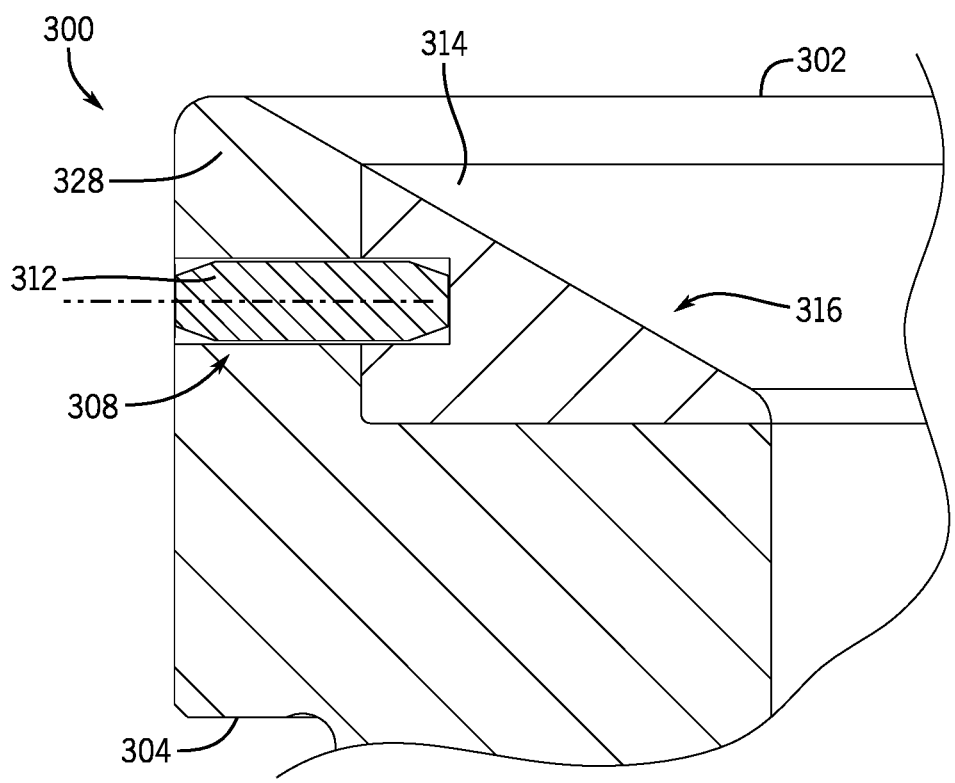
FIG. 3F is a cross-sectional view of an embodiment of a valve seat, in accordance with embodiments of the present disclosure.

FIG. 3F is a detailed cross-sectional view of an embodiment of the valve seat 300 further illustrating a different first portion configuration. In this example, the first portion 302 is positioned within the recessed portion 316 of the second portion 304. However, compared to FIGS. 3C and 3E, the illustrated shoulder 328 is not covered by the first portion 302 in FIG. 3F. That is, when viewed from the top, both the second portion 304 and the first portion 302 will be visible. In other words, the second portion 304 circumferentially surrounds the first portion 302 such that at least a portion of the second portion 304 is at an axially higher or equal position to the first portion 302. It should be appreciated that various embodiments may be arranged such that the second portion 304 forms at least some of the strike face 314. However, in other embodiments, even with the configuration of FIG. 3F, the strike face 314 may correspond to only the first portion 302. That is, the first portion 302 may be sized such that the strike face 314 is confined to the first portion 302.

In this example, the aperture 308 extends through the second portion 304 (e.g., through the shoulder 328) and into the first portion 302. The fastener 312, such as a lock pin, extends into the aperture 308 and secures the first portion 302 to the second portion 304. As noted, the fastener 312 may be secured within the aperture 308 via threads (e.g., threads coupling the fastener 312 to one or both of the first portion 302 or the second portion 304), adhesives, weld metals, interference fits, or the like. As such, two dissimilar metallic components may be joined together while reducing a risk of de-bonding due to differing mechanical and chemical properties. It should be appreciated that various secondary methods may also be utilized with embodiments of the present disclosure in order to form a hybrid coupling system where both a mechanical fastener and a secondary/alternative coupling method is also utilized.

Figure 4A:
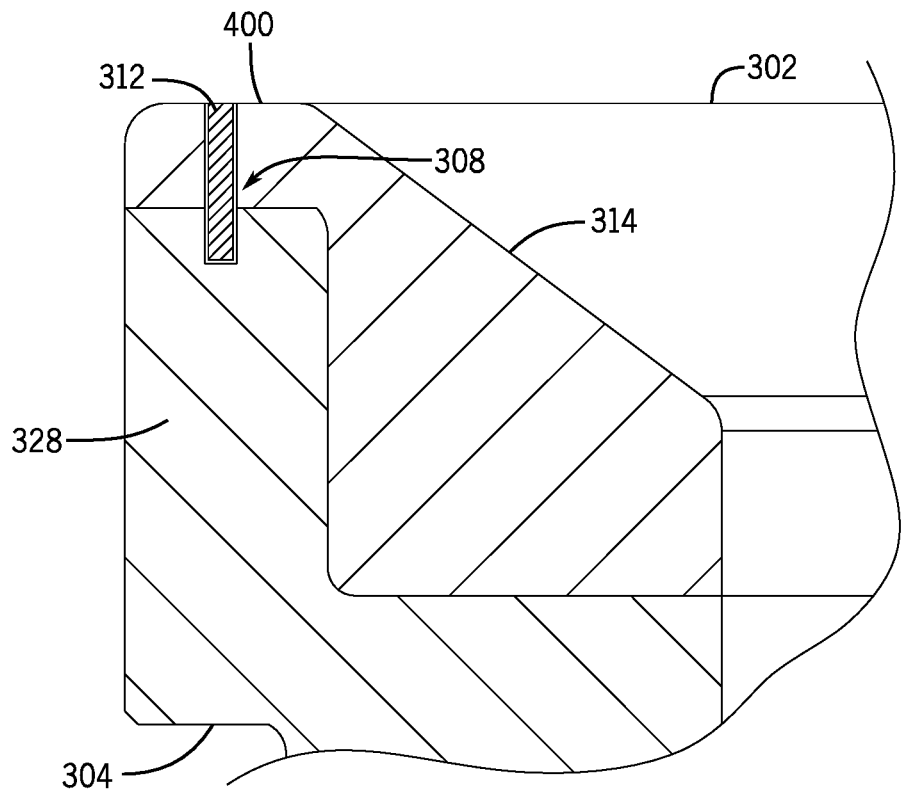
FIG. 4A is a cross-sectional view of an embodiment of a valve seat, in accordance with embodiments of the present disclosure.

FIG. 4A is a cross-sectional view of an alternative mounting arrangement, which may be incorporated with embodiments of the present disclosure. In this example, the first portion 302 is coupled to the second portion 304 via the fastener 312 that extends axially through the first portion 302 and the second portion 304, as opposed to radially as shown in FIGS. 3A-3F. In this example, the shoulder 328 is overlapped by an extension 400 of the first portion 302. It should be appreciated that the extension 400 is shown as a planar extension by way of example only, and that in other embodiments the extension 400, and as a result the shoulder 328, may be sloped. Furthermore, while the illustrated embodiment fully covers the shoulder 328, it should be appreciated that the shoulder 328 may only be partially covered.

In this example, the aperture 308 is arranged axially and extends through an entire thickness of the extension 400 and partially into the shoulder 328. As a result, the fastener 312 may extend axially through both the first portion 302 and the second portion 304 to secure the first portion 302 to the second portion 304. As noted above, the fastener 312 may further be secured within the aperture 308 via one or more fasteners, an adhesive, weld metal, an interference fit, or the like. The location of the aperture 308 may be particularly selected such that the strike face 314 is not associated with the aperture 308 and/or the extension 400, thereby reducing a likelihood of external contact forces being applied directly to the aperture 308 and/or the fastener 312.

Figure 4B:
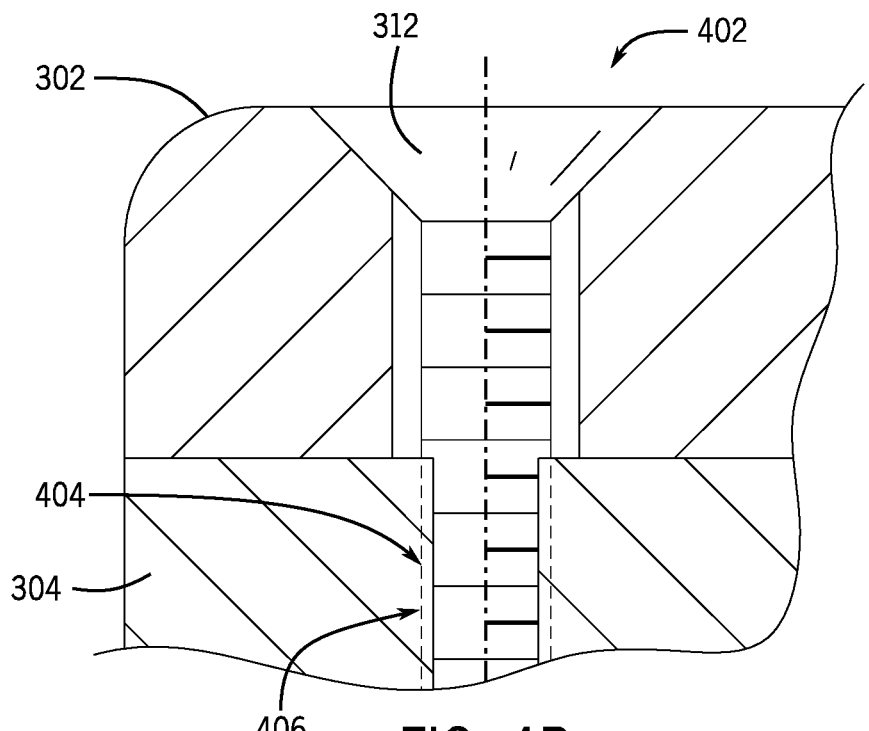
FIG. 4B is a detailed cross-sectional view of an embodiment of a valve seat fastening system, in accordance with embodiments of the present disclosure.

FIG. 4B is a cross-sectional view of the axial coupling shown in FIG. 4A in which a countersunk hole 402 is utilized to join the first portion 302 (which as noted above may be a carbide portion) to the second portion 304 (which as noted above may be a steel base). In various embodiments, the fastener 312 may correspond to flathead screws that include threads 404 that joint to mating threads 406 formed in one or both of the first portion 302 or the second portion 304. The countersunk holes 402 in the first portion 302 may be either pre-formed before sintering or drilled after sintering. As noted above, the countersunk holes 402 may be positioned away from the metal-to-metal strike face 314 (not pictured) such that the countersunk holes 402 are radially outward from the strike face 314. While there may still be contact at the countersunk holes 402, the contact may be between a softer elastomer portion of the valve member 204 and not with a metallic component.

Figure 5A:
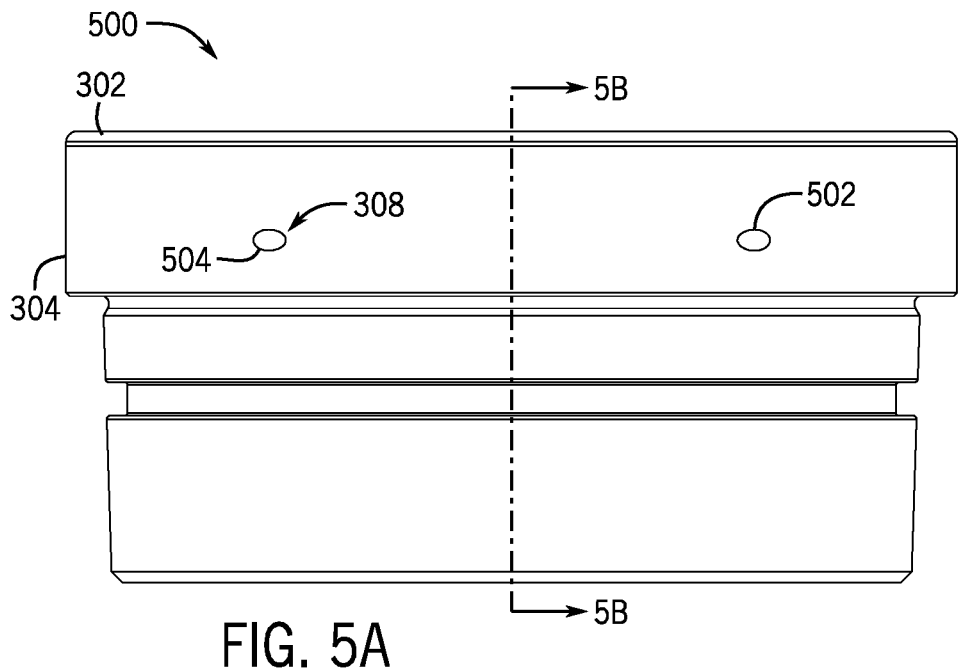
FIG. 5A is a side view of an embodiment of a valve seat, in accordance with embodiments of the present disclosure.
Figure 5B:
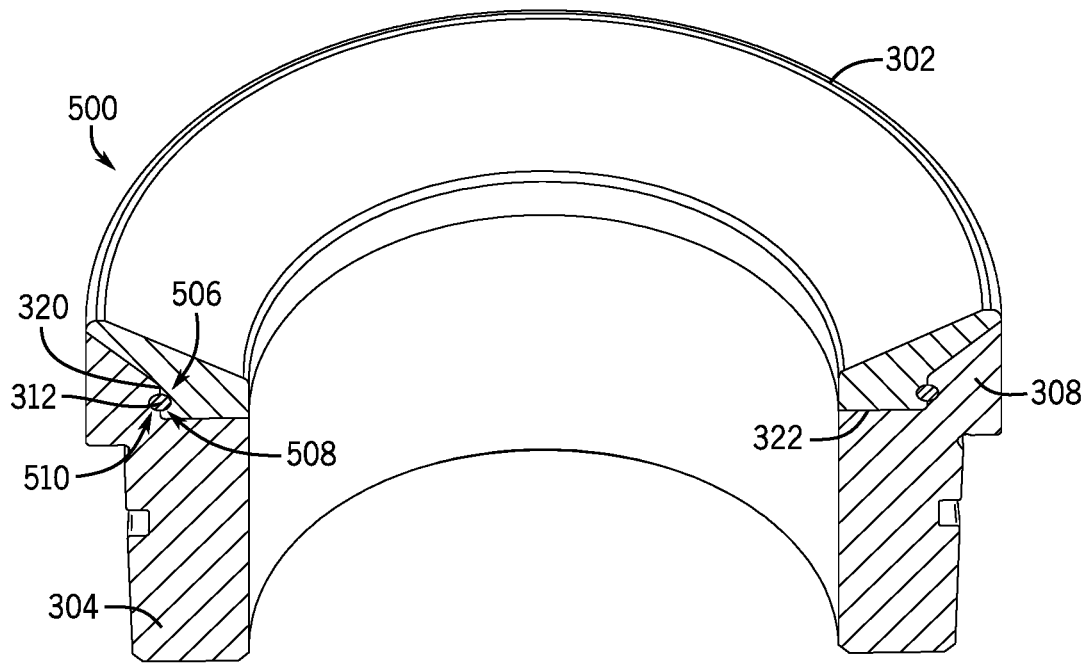
FIG. 5B is a sectional view of an embodiment of a valve seat taken along line 5B-5B, in accordance with embodiments of the present disclosure.
Figure 5C:
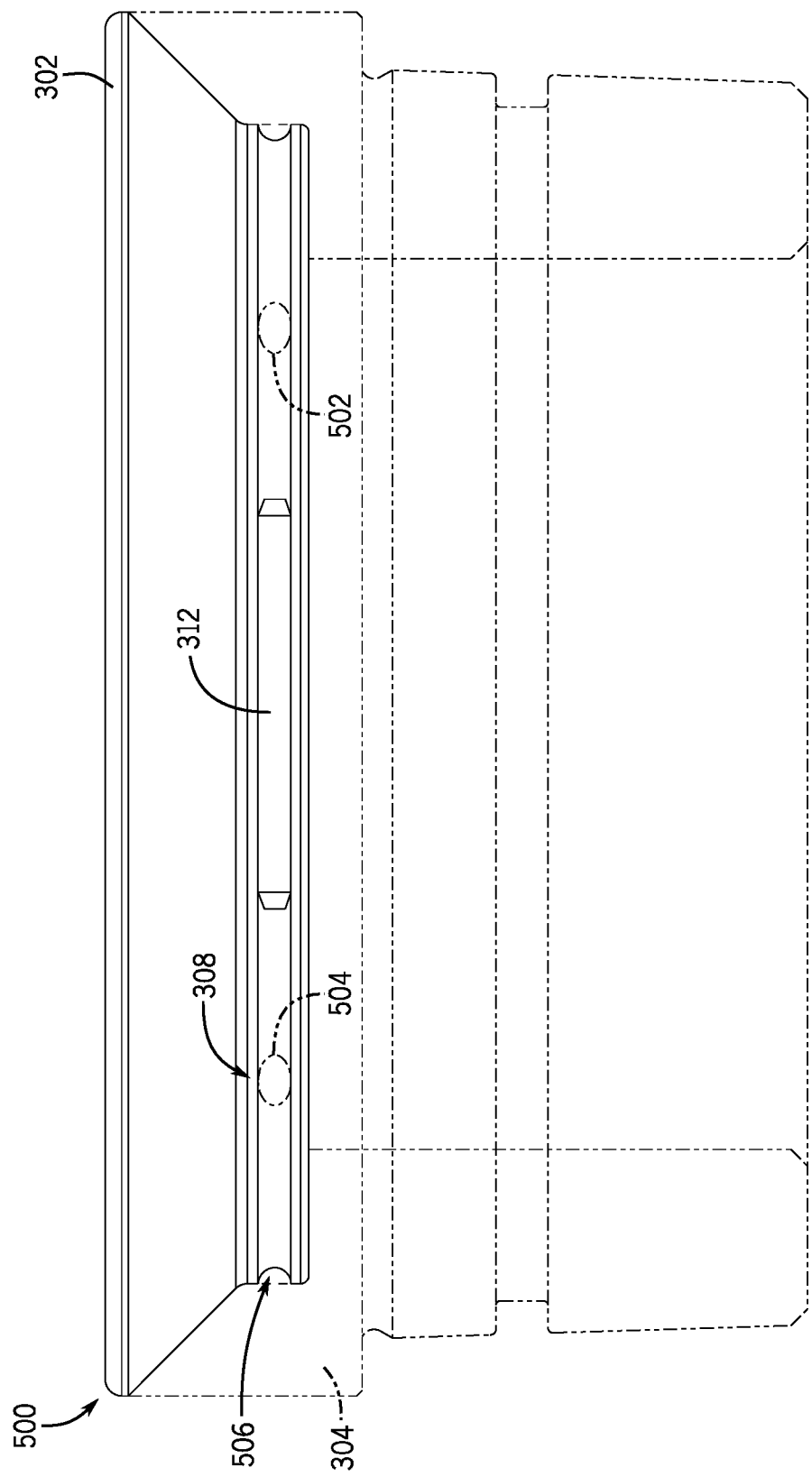
FIG. 5C is a side view of an embodiment of a valve seat, in accordance with embodiments of the present disclosure.

FIGS. 5A-5C illustrate an example configuration that may utilize a hybrid joining process incorporating both a mechanical fastener and one or more secondary mounting systems, such as, but not limited to, press fittings, thermal shrink fittings, one or more joining processes, welding, adhesives, and the like. In this example, one or more openings may be utilized to receive a circumferentially extending bar that blocks movement of a first portion relative to a second portion in at least one direction. The extending bar may only extend for a certain circumferential extent, which may be less than the entire circumference, and in at least one embodiment may be installed through slots or holes that align with a groove formed in the first portion.

FIG. 5A is a side view of an embodiment of a valve seat 500, which may correspond to or include one or more similar features of the valve seat 300. In this example, the second portion 304 is arranged such that the first portion 302 overlaps or otherwise covers the second portion 302. In other words, when looking at the valve seat 500 from above, the second portion 304 would be covered by the first portion 302. As noted above, in various embodiments, the first portion 302 may not entirely cover the second portion 304, and as a result, the embodiment of FIG. 5A is for illustrative purposes only and not intended to limit the scope of the present disclosure.

The illustrated embodiment includes apertures 308 that extend into the second portion 304. In this example, the apertures 308 are formed within the second portion 304 such that a first end 502 of the aperture is coupled to a second end 504 of the aperture forming a continuous aperture that, as will be shown below, extends only through the second portion 304 and not through the first portion 302. In other words, the aperture 308 in the embodiment of the valve seat 500 is not a radial or axial aperture, as shown in other embodiments, but may be considered a tangential orifice that extends through the second portion 304.

FIG. 5B is a sectional view of an embodiment of the valve seat 500 in which the first portion 302 is coupled to the second portion 304 via the fastener 312, which in this example may be a bar or a bar segment, as will be described below. As shown, the fastener 312 is positioned within a groove 506, with a first groove section 508 formed in the first portion 302 and a second groove section 510 formed in the second portion 304. It should be appreciated that the illustrated embodiment shows a circular groove 506, but such a configuration is by way of non-limiting example and it should be appreciated that the groove 506 may have a variety of different cross-sectional shapes, such as geometric shapes, ovals, dovetails, and the like. Furthermore, the groove 506 may be entirely formed within one of the first portion 302 or the second portion 304. Additionally, the groove 506 may not be equally distributed between the first portion 302 and the second portion 304, where a larger portion of the groove 506 may be in one or the other. The fastener 312 may be inserted through the aperture 308 (not pictured), which may be aligned with the groove 506, thereby enabling the fastener 312 to secure the first portion 302 to the second portion 304. For example, upward axial movement of the first portion 302 relative to the second portion 304 is blocked by the fastener 312. Additionally, as noted above, various embodiments may also utilize a hybrid connection process in which a secondary connection mechanism, such as a press fit, thermal shrink fit, welding process, brazing, adhesive, or the like may also be utilized, in addition to the mechanical fastener, to join the first portion 302 to the second portion 304.

In the illustrated embodiment, the groove 306 is formed along the transition 320, but it should be appreciated that the groove 306 may be positioned at a variety of different positions instead of, or in addition to, the illustrated location at the transition 320. For example, the groove 306 may be arranged along the sloped region 318, at the shoulder 328, along the planar region 322, or at any other reasonable location. Furthermore, different circumferential positions may include differently positioned grooves 306. In at least one embodiment, the groove 306 extends for only a partial circumferential length of the valve seat 500 (e.g., a segment). In other embodiments, the groove 306 may extend for an entire circumferential length of the valve seat 500.

FIG. 5C is a side view of the valve seat 500 in which the second portion 304 is shown in phantom to illustrate a position of the fastener 312 within the groove 506. As shown, the aperture 308 provides access to the groove 506 via the first end 502 and the second end 504. The fastener 312 may then be installed within the groove 506 after the first portion 302 is lowered into the second portion 304, thereby aligning the first groove section 508 (not picture) with the second groove section 510 (not pictured). In this example, the fastener 312 only extends for a particular circumferential extent of the valve seat 500, but it should be appreciated that this circumferential extend can be anywhere from approximately 360 degrees to approximately 5 degrees. Additionally, multiple fasteners 312 may be utilized in segments to provide 360 degree coverage. For example, ten fasteners 312 that extend for 36 degrees of coverage may be installed within the aperture 308 to secure the first portion 302 to the second portion 304.

FIGS. 6A-6D illustrate an example configuration that may utilize a hybrid joining process incorporating both a mechanical fastener and one or more secondary mounting systems, such as, but not limited to, press fittings, thermal shrink fittings, joining processes, welding, adhesives, and the like. In this example, a slot or groove may be formed within a first portion and a second portion to receive a snap ring and/or one or more snap ring segments. The snap ring may block movement of the first portion relative to the second portion after installation. In contrast to other embodiments described herein, the snap ring may not be installed through one or more external openings formed in one or more of the first portion or the second portion.

Figure 6A:
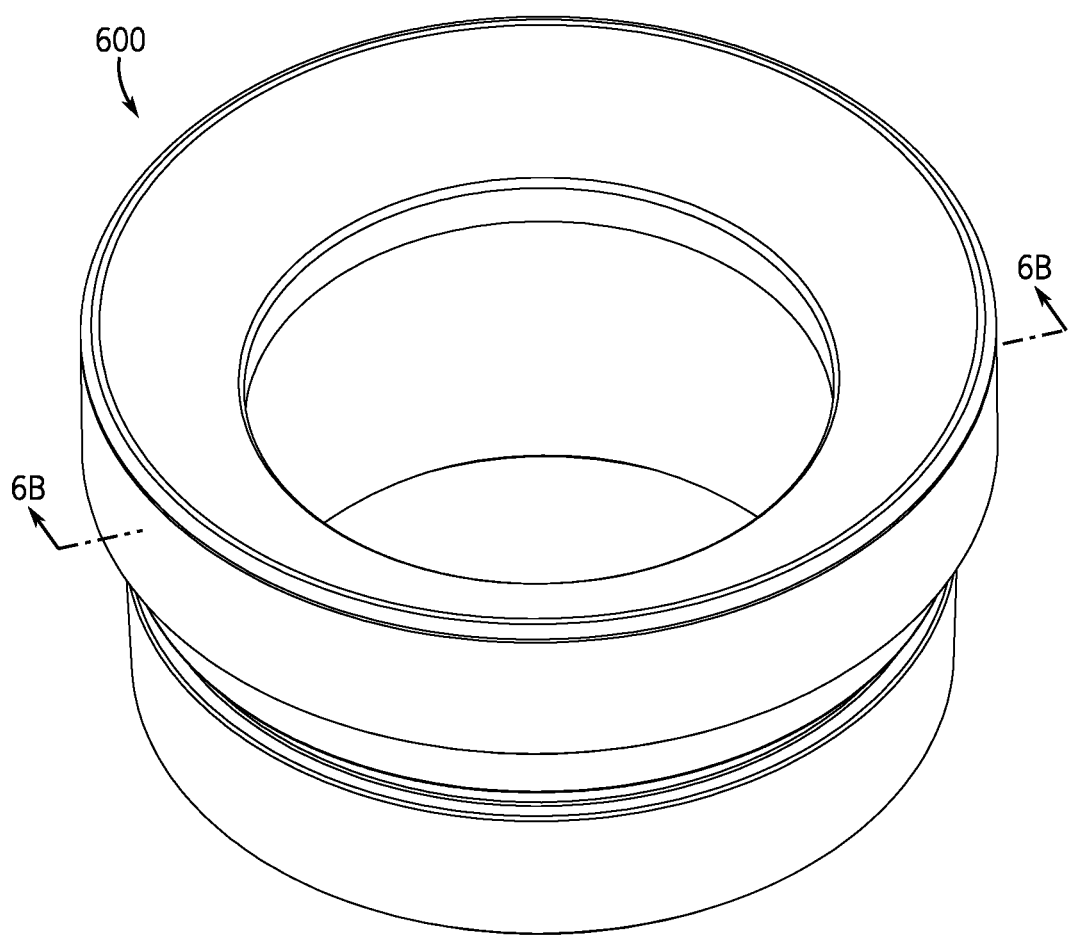
FIG. 6A is a perspective view of an embodiment of a valve seat, in accordance with embodiments of the present disclosure.

FIG. 6A is a perspective view of an embodiment of a valve seat 600 incorporating one or more hybrid fastening mechanisms. It should be appreciated that the valve seat 600 may include or share one or more features with the valve seats 300, 500. In this example, the apertures 308 of valve seats 200, 300 are omitted from the valve seat 600. As will be described, the valve seat 600 may utilize an internal mechanical fastener, in addition to or in place of, secondary fastening methods.

Figure 6B:
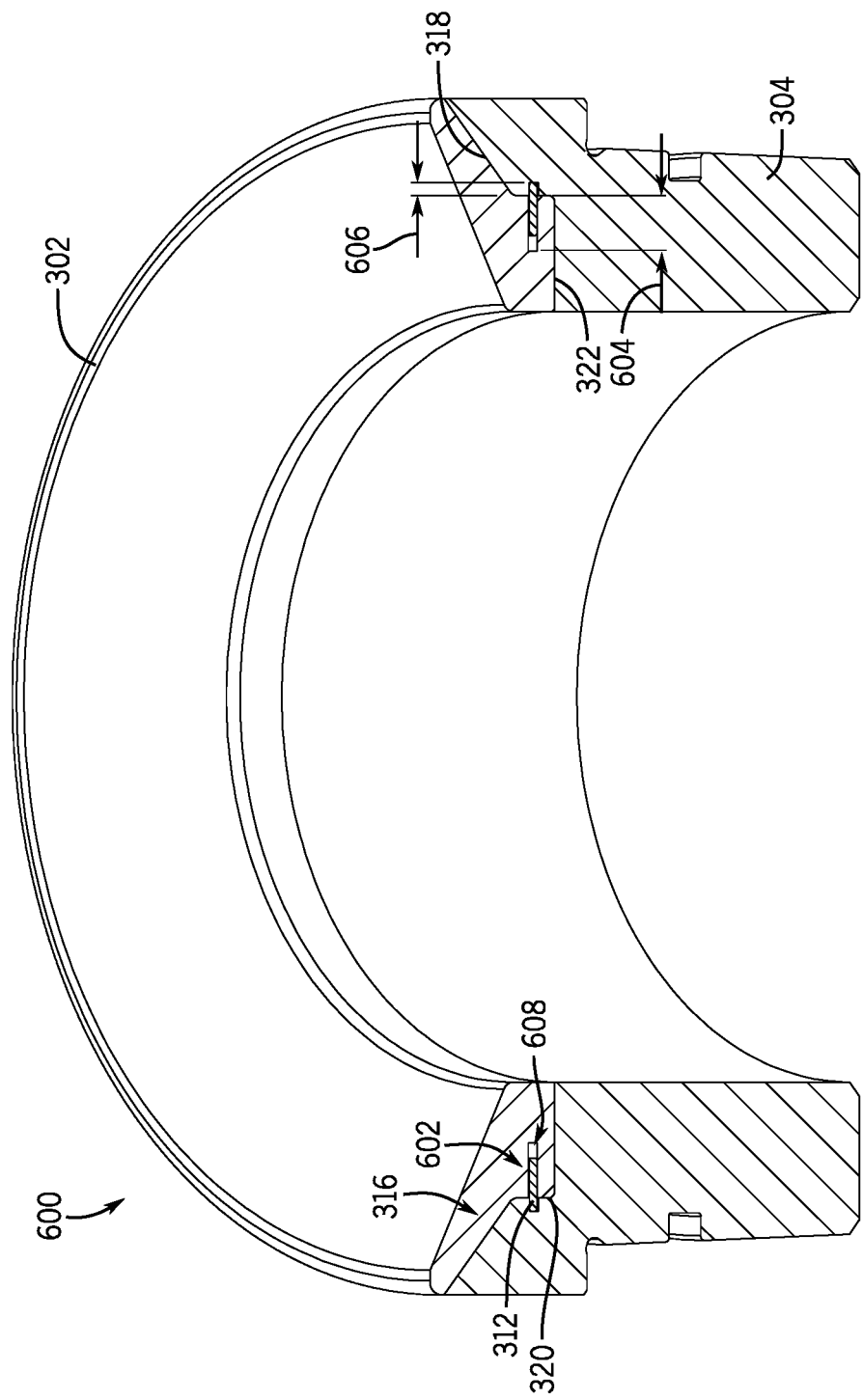
FIG. 6B is a sectional view of an embodiment of a valve seat taken along line 6B-6B, in accordance with embodiments of the present disclosure.

FIG. 6B is a sectional view of an embodiment of the valve seat 600 illustrating the first portion 302 coupled to the second portion 304 via the fastener 312 (shown as a ring) positioned within a slot 602. The illustrated slot 602 is formed in both the first portion 302 and the second portion 304. Upon installation, the fastener 312 blocks axial movement of the first portion 302 away from the second portion 304, thereby forming a mechanical fastening between the components. Furthermore, as noted above, the fastener 312 may also be used with one or more secondary fastening methods, such as press fits, thermal shrink fits, brazing, welding, adhesives, and the like.

In this example, the slot 602 is positioned to extend through the transition 320, but it should be appreciated that the slot 602 may be at any reasonable portion of the first portion 302 and/or the second portion 304. For example, the slot 602 may be arranged at the sloped region 318. Furthermore, the illustration of the radial slot 602 is for illustrative purposes only, as the slot 602 may be angled or arranged axially.

In at least one embodiment, the fastener 312 is a ring (e.g., a snap ring) that may be compressed during installation and then expand outwardly into the slot 602 formed in the second portion 304. For example, in the disclosed embodiment, a first portion slot length 604 is greater than a second portion slot length 606. The fastener 312 may be a ring, which is either a continuous ring, a split ring, a segmented ring, or the like, that may be compressed into the slot 602 within the first portion 302. Thereafter, the first portion 302 may be installed within the recessed portion 316 and, when the slots 602 within each of the first and second portions 302, 304 are aligned, the fastener 312 may rebound and extend radially outward and into the second portion 304, thereby securing the first portion 302 to the second portion 304. Such an expansion may be shown in FIG. 6B by the gap 608 shown between the fastener 312 and the radially inward portion of the slot 602. It should be appreciated that various embodiments may include a larger slot length with respect to the second portion 304 such that the fastener 312 may be first installed within the second portion 304 and then rebound radially inward toward the slot 602 in the first portion 302.

Figure 6C:
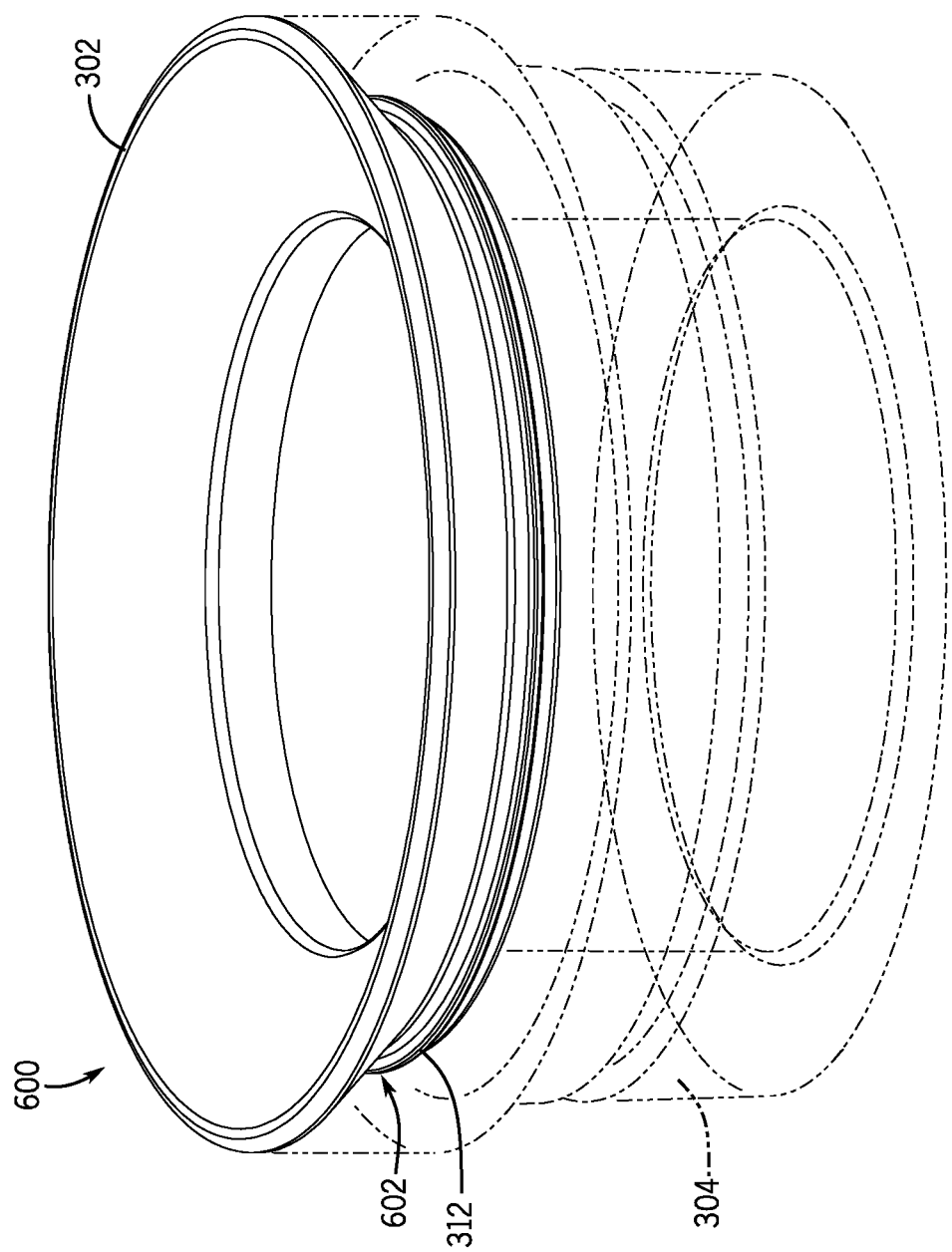
FIG. 6C is a perspective view of an embodiment of a valve seat, in accordance with embodiments of the present disclosure.

FIG. 6C is a perspective view of the valve seat 600 in which the second portion 304 is shown as being transparent to illustrate the arrangement of the fastener 312, which in this example is shown as a continuous ring positioned within the slot 602. As previously noted, the fastener 312 may not be continuous and may be segmented and/or may only be arranged at particularly selected locations along the circumference of the first portion 302.

Figure 6D:
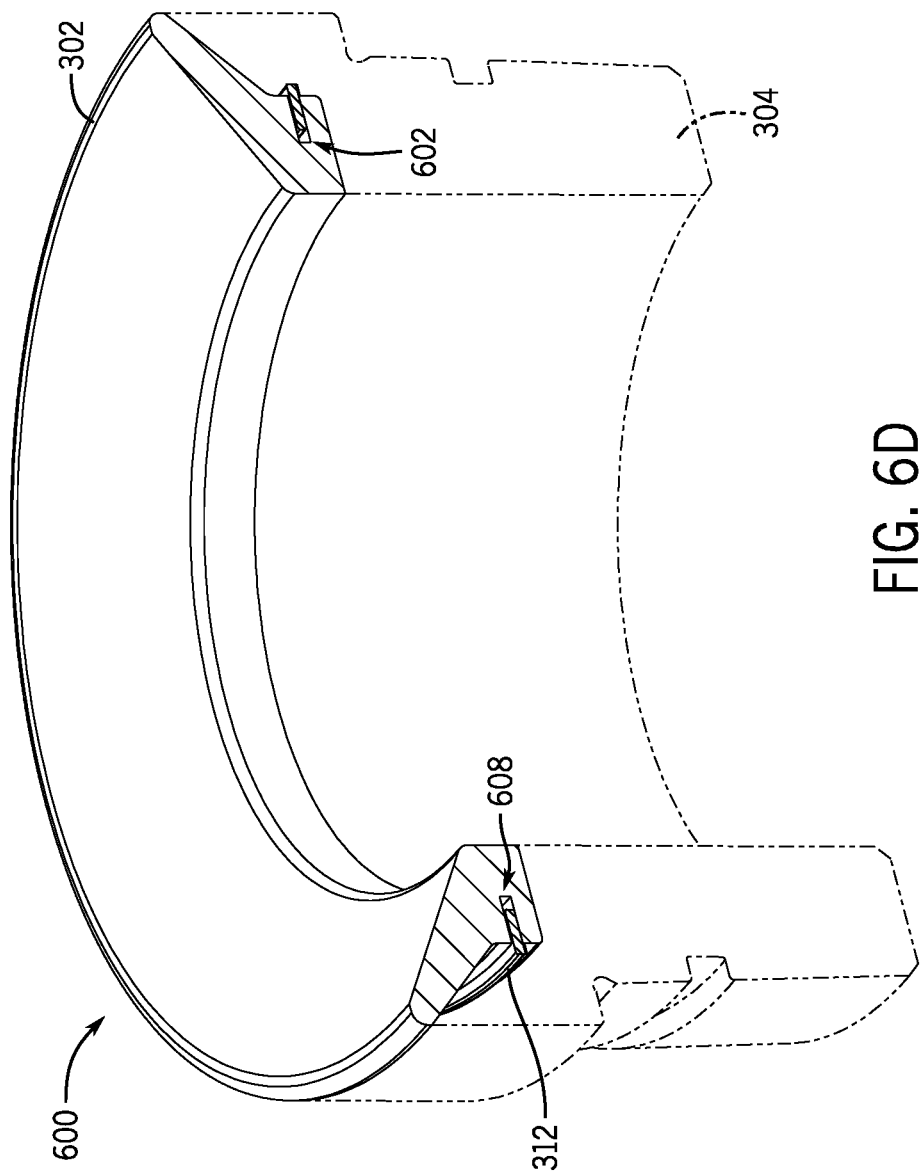
FIG. 6D is a sectional view of an embodiment of a valve seat, in accordance with embodiments of the present disclosure.

FIG. 6D is a sectional view of the valve seat 600 in which the second portion 304 is shown as being transparent to illustrate the arrangement of the fastener 312 within the slot 602. In this example, the gap 608 is illustrated between the fastener 312 and the first portion 302. The gap 608 may form, as noted above, due to the expansion of the fastener 312 after installation. For example, the fastener 312 may be a ring or a split ring that is partially deformed in order to position the fastener around the first portion 302 (or to position the fastener 312 within the slot 602 of the second portion). Upon installation of the first portion 302, the fastener 312 may return to its original configuration when the slots 602 are aligned. Accordingly, the gap 608 may be formed. It should be appreciated that the gap 608 may also, or alternatively, be positioned between the fastener 312 and the second portion 304. Additionally, use of the fastener 312 as shown herein does not limit the use of the arrangement of the valve seat 600 with one or more secondary or additional fastening methods, such as press fitting, thermal shrink fitting, adhesives, brazing, welding, and the like.

Figure 7A:
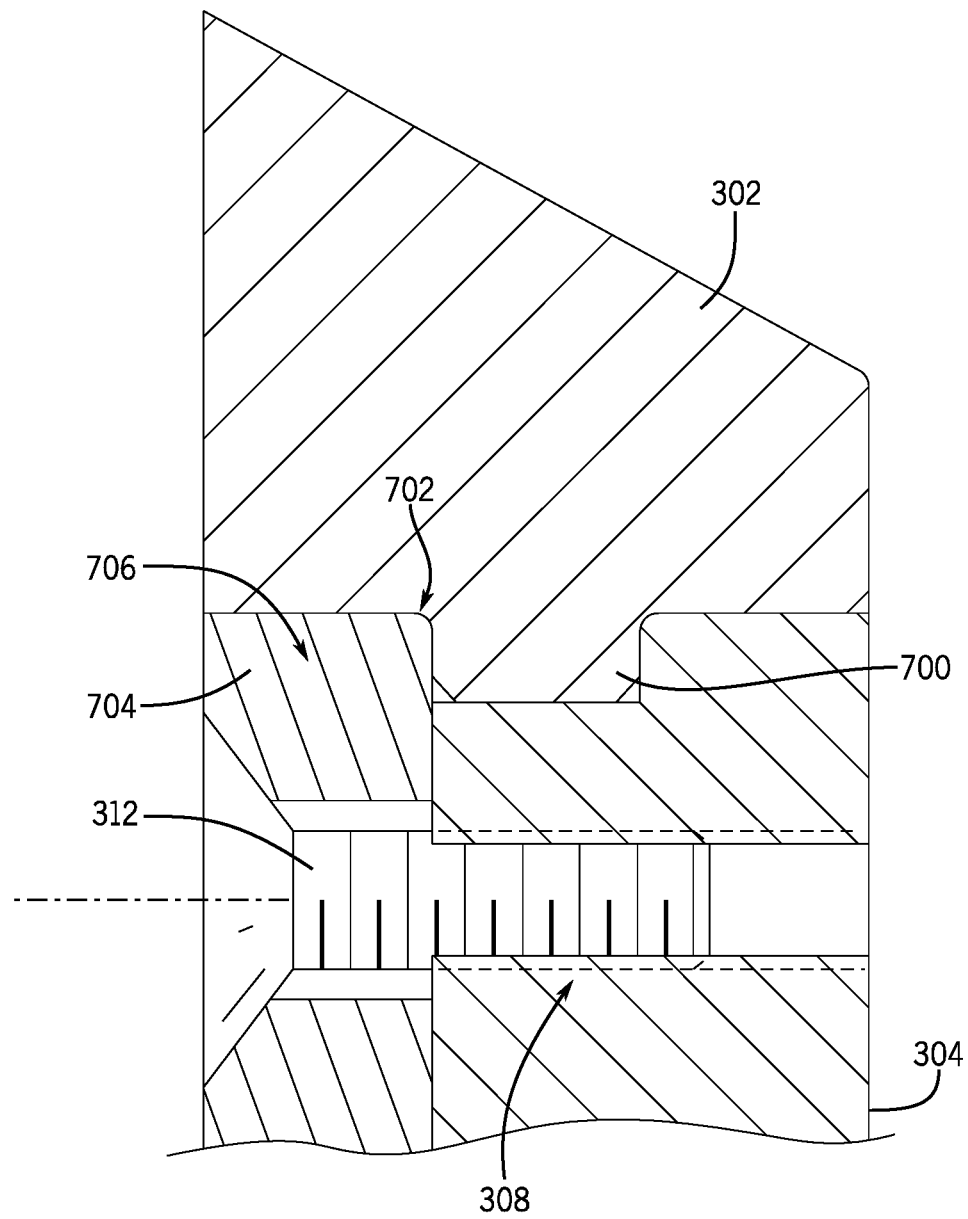
FIG. 7A is a cross-sectional view of an embodiment of a valve seat, in accordance with embodiments of the present disclosure.

FIG. 7A is a cross-sectional view of an embodiment of a fastening system for a valve seat, such as the valve seats 300, 500, 600 in which a mounting ring is used in place of an aperture formed within the first portion 302. In contrast, the aperture 308 may only be formed within the second portion 304 while an overlapping region maintains a position of the first portion 302, as shown.

In this example, the first portion 302 includes a lip 700 that extends into a depression 702 associated with the second portion 304. In this example, the depression 702 is arranged near an outer diameter of the second portion 304. A ring or sleeve 704 is then coupled to the second portion 302 via one or more fasteners 312 extending through apertures 308 formed within the ring 704 and the second portion 304. For example, the fasteners 312 may be threaded fasteners, pins, and the like. Additionally, the fasteners 312 may be further secured to one or more of the ring 704 and/or the second portion 304 using secondary materials, such as weld metal or adhesives.

The illustrated ring 704 includes a top overlapping region 706 that is positioned proximate the depression 702, thereby securing the lip 700 between the ring 704 and the second portion 304. Accordingly, as the ring 704 is coupled to the second portion 304, axial movement of the first portion 302 may be blocked. It should be appreciated that the configuration of FIG. 7A is by way of example only and is not intended to limit the scope of the present disclosure. For example, the first portion 302 may include a void or a recess that receives a portion of one or more of the second portion 304 and/or the ring 704. Additionally, the arrangement shows a substantially planar or flat interface between the first portion 302 and the second portion 304, but it should be appreciated that the interface may be arranged at an angle or sloped, in addition to or in lace of one or more planar regions, as noted above with respect to the valve seats 300, 500, 600.

Figure 7B:
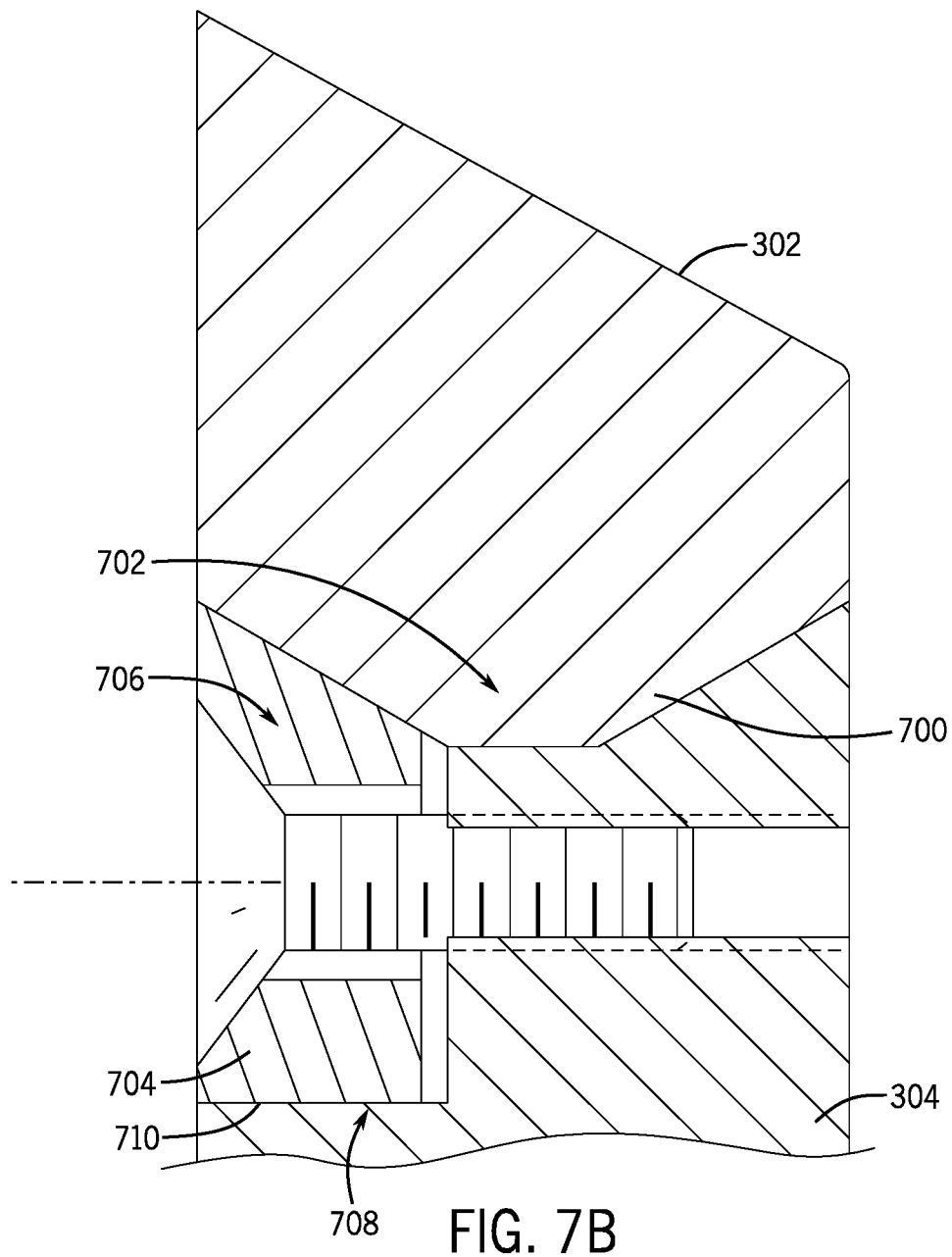
FIG. 7B is a cross-sectional view of an embodiment of a valve seat, in accordance with embodiments of the present disclosure.

FIG. 7B is a cross-sectional view of an embodiment of a coupling system in which the ring 704 is shown with a different configuration in which the lip 700 of the first portion 302 includes a profile that conforms to sloped surfaces of both the lip 700 and the second portion 304. In this configuration, the ring 704 includes the top overlapping region 706 that at least partially overlaps the first portion 302 and secures the lip 700 within the depression 702. As shown, the fastener 312 is used to join the ring 704 to the second portion 304, thereby securing the first portion 302 to the second portion 304. As will be appreciated, configurations such as those in FIGS. 7A and 7B may reduce stress concentrations and further eliminate potentially time consuming or expensive machining steps where apertures are formed within the first portion 302, which may be a hard or resistant material and potentially difficult to machine.

In this example, the ring 704 is positioned within a receiving region 708, that includes a base 710 to receive and support the ring 704. For example, a portion of the second portion 304 may be configured to receive the ring 704, or a ring segment, such that the ring 704 may be brought against the first portion 302 to secure the first portion 302 in place.

Systems and methods of the present disclosure may be directed toward mechanical mounting methods and hybrid mounting methods to join a first component to a second component, where the first and second components may be formed from different materials with different physical or chemical properties. In at least one embodiment, a first mounting method may utilize one or more mechanical fasteners. In at least one embodiment, a second mounting method may utilize one or more mechanical mounting methods and/or one or more chemical mounting mechanisms, which may include but are not limited to, thermal shrink-fill, fusing, or brazing. Using both of these methods may reduce a likelihood of de-bonding or other undesirable effects on the components when exposed to pressure and may provide a lower cost solution for coupling different components together.

The foregoing disclosure and description of the disclosed embodiments is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents. As will be described above, in one or more embodiments the packing sleeve 220 is secured to the block 104 using one or more fasteners that may extend through one or more intermediate components. In at least one embodiment, a retaining system may not include a preload element.

The invention claimed is:

1. A valve seat for use within a hydraulic fracturing pump, the valve seat comprising:
    a first portion including:
        a strike face for interacting with a reciprocating component associated with the valve seat; and
        a first bore extending axially through the first portion;
    a second portion including:
        a recess in which at least a portion of the first portion is received;
        a second bore extending axially through the second portion and substantially aligned with the first bore; and
        an aperture extending from a circumference of the second portion to the recess; and
    a mechanical fastener extending through the aperture and at least partially into the first portion thereby to prevent any axial movement of the first portion relative to the second portion in a first axial direction and a second axial direction opposite the first axial direction,
    the first portion being coupled to the second portion via the mechanical fastener and via one or more of a press fit, a thermal shrink fit, brazing, welding, fusing, or cementing via adhesive.

2. The valve seat of claim 1, wherein the mechanical fastener includes a threaded fastener that is threadably engaged with the first portion.

3. The valve seat of claim 1, wherein the first portion comprises a first material, and the second portion comprises a second material different than the first material.

4. The valve seat of claim 3, wherein the first material comprises carbide, and the second material comprises steel.

5. The valve seat of claim 1, wherein the aperture is arranged in a radial configuration extending toward an axis of the second portion.

6. The valve seat of claim 1, wherein the aperture comprises a plurality of apertures at different circumferential positions around the first portion, and the mechanical fastener comprises a plurality of mechanical fasteners each received in one of the plurality of apertures.

7. The valve seat of claim 1, wherein the first portion includes a surface area, and the strike face has a surface area less than the surface area of the first portion.

8. The valve seat of claim 1, wherein the first portion does not fully cover the second portion.

9. The valve seat of claim 1, wherein the recess of the second portion comprises one or more of a sloped region, a transition, or a planar region.

10. The valve seat of claim 9, wherein the recess of the second portion comprises a transition, and the aperture extends through the transition.

11. The valve seat of claim 1, further comprising one of a plug or a seal received in the aperture and covering the mechanical fastener.

12. The valve seat of claim 1, wherein the second portion includes a shoulder, and the first portion covers the shoulder.

13. The valve seat of claim 1, wherein the second portion includes a shoulder, and the first portion does not cover the shoulder.

14. The valve seat of claim 1, wherein the second portion includes a shoulder, and the shoulder is sloped toward the second bore.

15. The valve seat of claim 1, wherein the first portion has a thickness, and the thickness of the first portion varies from an outer diameter of the first portion toward the first bore.

16. The valve seat of claim 1, wherein the second portion has an outer diameter and at least partially defines a recessed portion, the recessed portion having a cross-section including:
- a sloped region extending radially inward from the outer diameter; and
- a transition portion extending from the sloped region and parallel to the first axial direction, the aperture extending into the transition portion.

17. A valve assembly, comprising:
- a valve member configured to reciprocate within a bore; and
- a valve seat having a strike face, the strike face positioned to contact the valve member, the valve seat comprising:
  - a first portion including:
    - at least a portion of the strike face; and
    - a first bore extending axially through the first portion;
  - a second portion including:
    - a recess in which at least a portion of the first portion is received;
    - a second bore extending axially through the second portion and substantially aligned with the first bore; and
    - an aperture extending from a circumference of the second portion to the recess; and
  - a mechanical fastener extending through the aperture and at least partially into the first portion thereby to prevent any axial movement of the first portion relative to the second portion in a first axial direction and a second axial direction opposite the first axial direction,
  - the first portion being coupled to the second portion via the mechanical fastener and via one or more of a press fit, a thermal shrink fit, brazing, welding, fusing, or cementing via adhesive.

18. The valve assembly of claim 17, wherein the first portion comprises a first material, and the second portion comprises a second material, and wherein the first material comprises carbide and the second material comprises steel.

19. The valve assembly of claim 17, wherein the aperture is arranged in a radial configuration extending toward an axis of the second portion.

20. The valve assembly of claim 17, wherein:
the first bore and the second bore are aligned along a central axis, and wherein the first portion fully covers the second portion when the first portion of the valve seat is viewed from a side of the valve assembly opposite the second portion relative to the first portion and in a direction along the central axis.

21. The valve assembly of claim 17, wherein the mechanical fastener includes a threaded fastener that is threadably engaged with the first portion.

22. The valve assembly of claim 17, wherein the aperture comprises a plurality of apertures at different circumferential positions around the first portion, and the mechanical fastener comprises a plurality of mechanical fasteners each received in one of the plurality of apertures.

23. The valve assembly of claim 17, wherein the first portion includes a surface area, and the strike face has a surface area less than the surface area of the first portion.

24. The valve assembly of claim 17, wherein the first portion does not fully cover the second portion.

25. The valve assembly of claim 17, wherein the recess of the second portion comprises one or more of a sloped region, a transition, or a planar region.

26. The valve assembly of claim 25, wherein the recess of the second portion comprises a transition, and the aperture extends through the transition.

27. The valve assembly of claim 17, further comprising one of a plug or a seal received in the aperture and covering the mechanical fastener.

28. The valve assembly of claim 17, wherein the second portion includes a shoulder, and the first portion covers the shoulder.

29. The valve assembly of claim 17, wherein the second portion includes a shoulder, and the first portion does not cover the shoulder.

30. The valve assembly of claim 17, wherein the second portion includes a shoulder, and the shoulder is sloped toward the second bore.

31. The valve assembly of claim 17, wherein the first portion has a thickness, and the thickness of the first portion varies from an outer diameter of the first portion toward the first bore.

32. The valve assembly of claim 17, wherein the second portion has an outer diameter and at least partially defines a recessed portion, the recessed portion having a cross-section including:
- a sloped region extending radially inward from the outer diameter; and
- a transition portion extending from the sloped region and parallel to the first axial direction, the aperture extending into the transition portion.

* * * * *